(12) United States Patent
Ide et al.

(10) Patent No.: US 7,190,500 B2
(45) Date of Patent: Mar. 13, 2007

(54) DEFORMABLE MIRROR HAVING DISPLACEMENT DETECTING FUNCTION

(75) Inventors: Takayuki Ide, Hachioji (JP); Shinji Kaneko, Kokubunji (JP); Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 610 days.

(21) Appl. No.: 09/961,409

(22) Filed: Sep. 25, 2001

(65) Prior Publication Data

US 2002/0101646 A1   Aug. 1, 2002

(30) Foreign Application Priority Data

Jan. 31, 2001  (JP) .............................. 2001-023187

(51) Int. Cl.
*G02B 26/08*  (2006.01)
(52) U.S. Cl. ...................... 359/224; 359/295; 359/291
(58) Field of Classification Search ................ 359/224, 359/291, 295, 872
See application file for complete search history.

(56) References Cited

U.S. PATENT DOCUMENTS

| | | | | |
|---|---|---|---|---|
| 5,307,082 A * | 4/1994 | Silverberg | ................ | 343/915 |
| 5,526,172 A * | 6/1996 | Kanack | ....................... | 359/291 |
| 5,955,659 A * | 9/1999 | Gupta et al. | ............... | 73/54.01 |
| 6,206,290 B1 * | 3/2001 | Giebel et al. | .......... | 235/462.36 |
| 6,275,326 B1 * | 8/2001 | Bhalla et al. | ............... | 359/298 |
| 6,293,680 B1 * | 9/2001 | Bruns | ......................... | 359/849 |
| 6,480,645 B1 * | 11/2002 | Peale et al. | .................... | 385/18 |
| 6,525,759 B2 * | 2/2003 | Kawai | ........................ | 347/239 |
| 6,538,802 B2 * | 3/2003 | Wang et al. | ................. | 359/298 |
| 6,625,341 B1 * | 9/2003 | Novotny | ....................... | 385/18 |
| 6,633,693 B1 * | 10/2003 | Peale et al. | .................... | 385/18 |
| 6,747,806 B2 * | 6/2004 | Gelbart | ....................... | 359/666 |
| 6,771,851 B1 * | 8/2004 | Yang | ........................... | 385/18 |

FOREIGN PATENT DOCUMENTS

JP        02-101402        4/1990

OTHER PUBLICATIONS

Vdovin, G., "Quick Focusing of Imagining Optics Using Micromachined Adaptive Mirrors," Optics Communication, vol. 140, Aug. 1, 1997, pp. 187-190.

* cited by examiner

*Primary Examiner*—Ricky D. Shafer
(74) *Attorney, Agent, or Firm*—Pillsbury Withrop Shaw Pittman, LLP

(57) ABSTRACT

A focal-length adjusting unit for photographing apparatuses includes a distance-measuring means for detecting the amount of defocus to an object by using a light beam of the object passing through a photographing optical system; at least two optical elements located in an optical path for distance measurement, deflecting incident light from the object to introduce the light into an image sensor or a distance-measuring sensor; a variable optical-property element constituting at least one of the optical elements, capable of changing the deflection of light in accordance with an applied voltage or an applied current; and a voltage applying means or a current applying means for applying a voltage or a current in accordance with the distance-measuring output of the distance-measuring means. In this case, before a distance measurement is made by the distance-measuring means, the function of light deflection of the variable optical-property element is set to a predetermined value.

13 Claims, 32 Drawing Sheets

TRANS-TYPE

CIS-TYPE

DEFORMABLE MIRROR HAVING DISPLACEMENT DETECTING FUNCTION

CROSS REFERENCE TO RELATED APPLICATIONS

This application claims priority to Japanese application No. 2001-023187, filed Jan. 1, 2001, the contents of which is incorporated herein in it entirety by reference.

BACKGROUND OF THE INVENTION

1. Field of the Invention

This invention relates to a displacement detecting mechanism for the reflecting surface of a deformable mirror which is provided with a flexible thin film having the reflecting surface and an upper electrode, deformed by electrostatic attraction, and a control electrode located opposite to the flexible thin film, and is constructed so that a voltage applied to the control electrode is controlled and thereby the reflecting surface can be properly deformed.

2. Description of Related Art

The deformable mirror of this type, disclosed in Japanese Patent Preliminary Publication No. Hie 2-101402, can be fabricated at low cost, with a high degree of accuracy, and in microminiaturization by applying a so-called MEMS (micro electro-mechanical system) technique which utilizes a semiconductor manufacturing technique. Thus, it is expected that the deformable mirror is applied to a minute optical system used in microoptics, such as an optical pickup, and to a small-sized portable device.

In such a deformable mirror whose shape is changed by the electrostatic attraction, the amount of change thereof is governed by the balance between the electrostatic attraction exerted between both electrodes and the tension of a flexible thin film. In order to change the deformable mirror to an optimum shape, it is necessary to control a high voltage (compared with an ordinary IC device) so that it remains stable over a wide range. In particular, for the power source where the deformable mirror is applied to a microminiature device, only a low-capacity and -voltage power source like a battery cell is available in most cases. Although it can be easily realized to derive a high-voltage power source from such a low-capacity and -voltage power source because of compactness of a voltage changing element in a piezoelectric transformer, it is very difficult to control the high voltage with stability and high accuracy, in such a boosting way, over a wide range.

SUMMARY OF THE INVENTION

It is, therefore, an object of the present invention to provide a deformable mirror in which the displacement of the reflecting surface of the deformable mirror is detected for feedback and thereby the shape of the deformable mirror can be controlled with a high degree of accuracy.

In order to achieve this object, the deformable mirror having the displacement detecting function of the present invention includes a flexible thin film having a reflecting surface and an upper electrode, deformed by electrostatic attraction, and a control electrode and a capacitance detecting electrode, located opposite to the flexible thin film. In this case, the displacement of the reflecting surface can be calculated from a static capacitance between the upper electrode and the capacitance detecting electrode. Whereby, the amount of displacement can be detected in a non-contacting state, without influencing the deformable mirror and providing other detecting mechanisms.

The deformable mirror having the displacement detecting function of the present invention is constructed so that the control electrode is also used as the capacitance detecting electrode. Whereby, the displacement can be detected without adding any change to the structure of the deformable mirror.

The deformable mirror having the displacement detecting function of the present invention is constructed so that the control electrode and the capacitance detecting electrode are configured separately as the same layer. Consequently, the displacement of a displacement detecting electrode can be detected as a pinpoint, irrespective of the shape of the control electrode.

The deformable mirror having the displacement detecting function of the present invention is constructed so that the control electrode and the capacitance detecting electrode are configured separately as different layers. Consequently, a constant-voltage source for deforming the deformable mirror can be set separate from a high-frequency source for detecting the displacement.

The deformable mirror having the displacement detecting function of the present invention is constructed so that a high-frequency voltage for detecting the static capacitance having a frequency much higher than a resonant frequency of the reflecting surface is superposed on the voltage of the constant-voltage source for deforming the reflecting surface, and a resistance is connected to the grounding side of the upper electrode to detect the amount of displacement of the reflecting surface from the phase and amplitude of an electric current flowing through the resistance. Whereby, a voltage application electrode can be also used as the capacitance detecting electrode.

The deformable mirror having the displacement detecting function of the present invention is constructed so that a high-frequency voltage of a frequency much higher than a resonant frequency of the reflecting surface is applied to the capacitance detecting electrode, and a resistance is connected to the grounding side of the upper electrode to detect the amount of displacement of the reflecting surface from the phase and amplitude of an electric current flowing through the resistance. Consequently, a high-voltage control circuit can be set separate from the high-frequency source.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings, the embodiments of the present invention will be described below.

Figure 1:
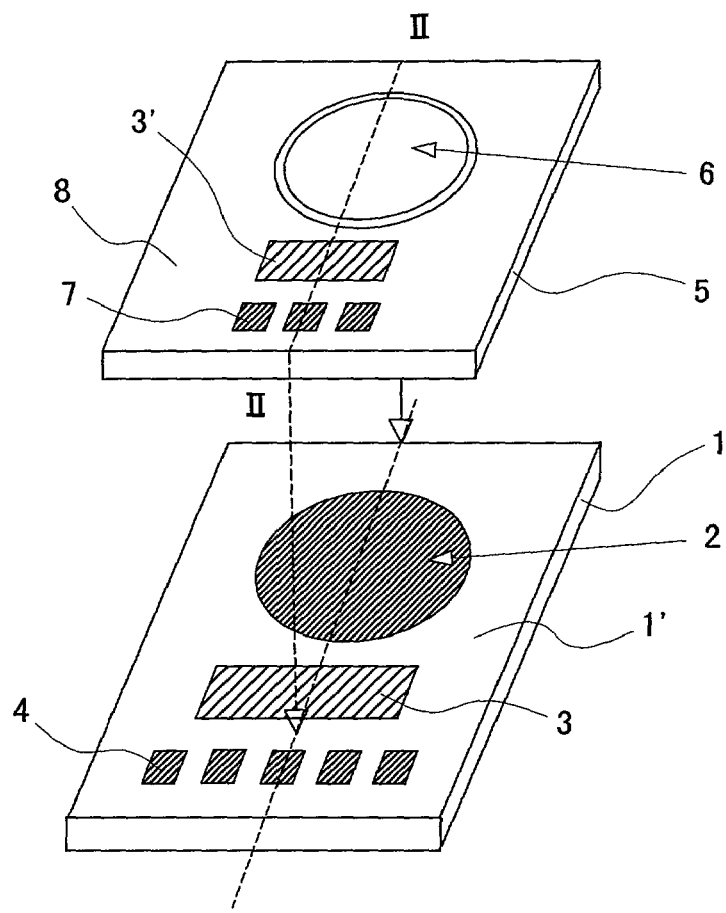
FIG. 1 is a perspective view showing a first embodiment of the deformable mirror in the present invention where an upper substrate is separated from a lower substrate.
Figure 2:
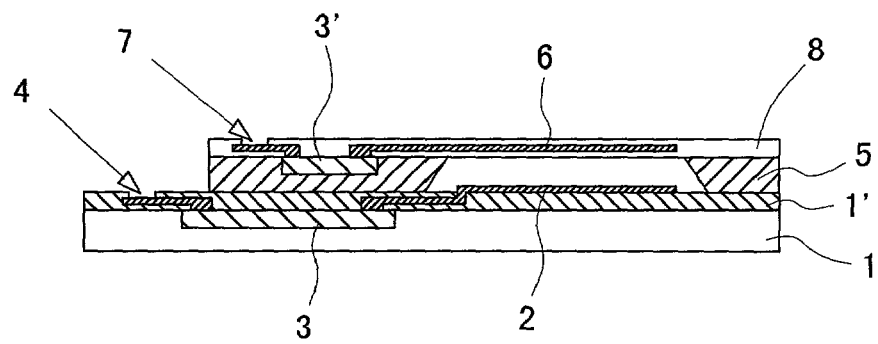
FIG. 2 is a sectional view taken along line II—II in FIG. 1.
Figure 3:
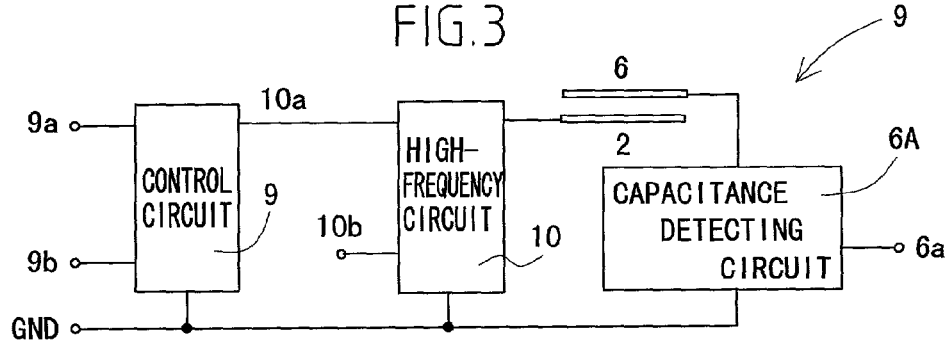
FIG. 3 is a block diagram showing a mutual connecting relationship between various circuits and electrodes.

In FIGS. 1 and 2, reference numeral 1 denotes a lower substrate having a control electrode 2, an electronic circuit section 3, a plurality of external lead electrodes 4, and an insulating film 1', and 5 denotes an upper substrate provided with external lead electrodes 7 and an electronic circuit section 3' and, as shown in FIG. 2, supporting a flexible thin film 8 including a reflecting surface and upper electrode 6. In FIG. 3, reference numeral 9 denotes a voltage control circuit provided with a high-voltage source 9a and a reference voltage source 9b to control the voltage of a constant-voltage source 10a applied to the control electrode 2; 10 denotes a high-frequency superposing circuit provided with the constant-voltage source 10a and a high-frequency source 10b to superpose a high-frequency voltage for detecting a static capacitance on the voltage of the constant-voltage source 10a; and 6A denotes a capacitance detecting circuit for detecting a change of the static capacitance between the control electrode 2 and the upper electrode 6. Also, any of the lower substrate, the upper substrate, the voltage control circuit, the high-frequency superposing circuit, and the capacitance detecting circuit is fabricated by means of a well-known semiconductor manufacturing technique. The voltage control circuit and the high-frequency superposing circuit are constructed as the electronic circuit section 3, integrally with the lower substrate 1, by using this technique, and the capacitance detecting circuit can be fabricated integrally with the upper substrate 5 on the electronic circuit section 3' by using the same technique.

Figure 4:
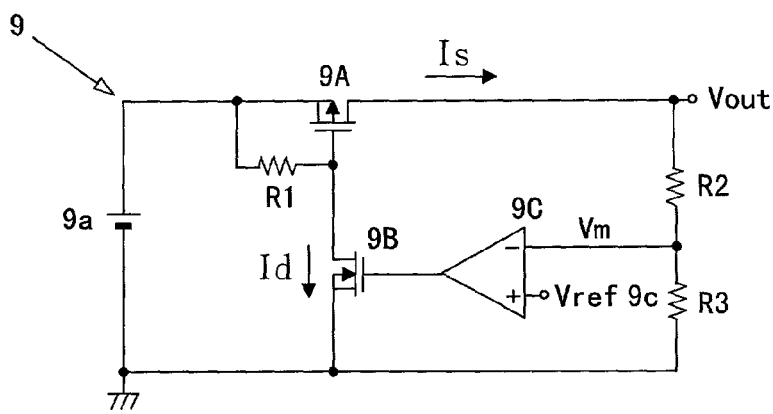
FIG. 4 is a wiring diagram showing one example of a voltage control circuit.
Figure 5:
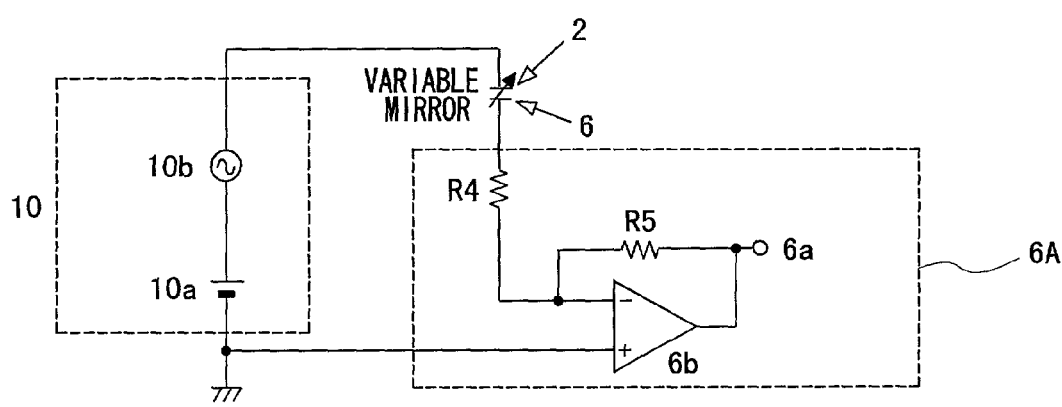
FIG. 5 is a diagram showing an equivalent circuit relative to a high-frequency superposing circuit and a capacitance detecting circuit in the present invention.
Figure 6A:
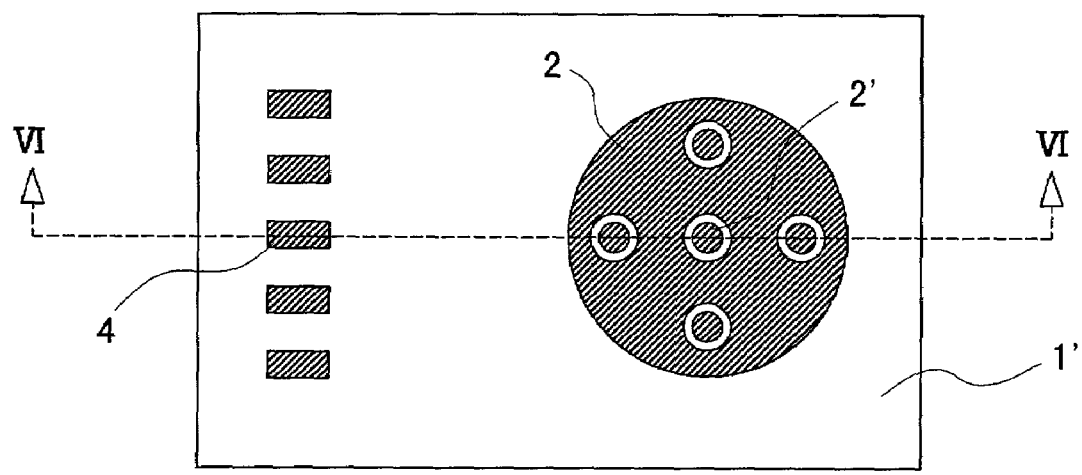
FIGS. 6A is a plan view showing the lower substrate in a second embodiment of the present invention.
Figure 6B:
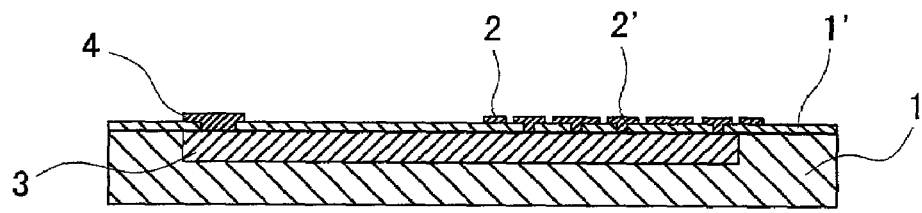
FIG. 6B is a sectional view taken along line VI—VI in FIG. 6A.
Figure 7:
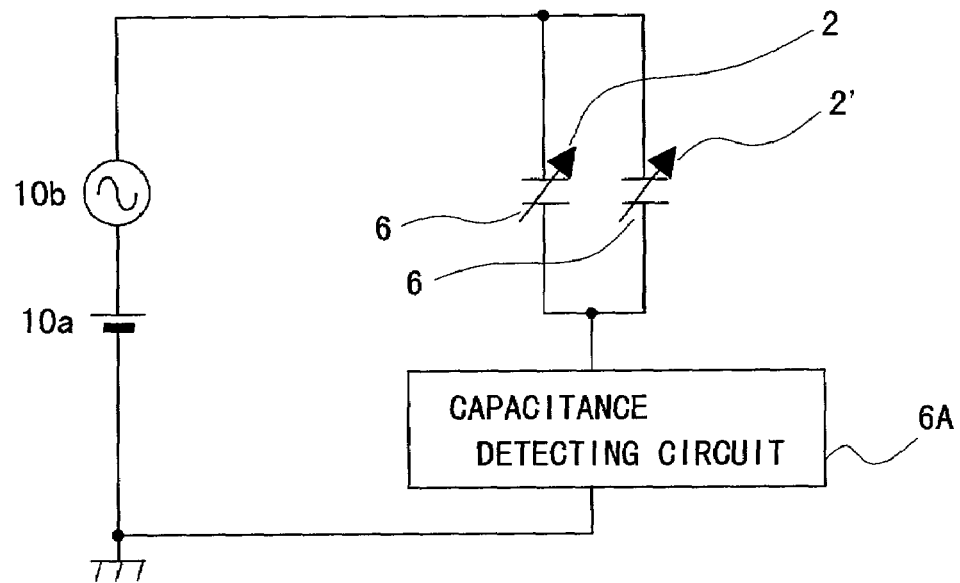
FIG. 7 is a diagram showing an equivalent circuit connecting individual elements where a constant-voltage source and a high-frequency source are integrally constructed.

In FIG. 4, reference numeral 9A represents a control element connected to the high-voltage source 9a to control a control current Is flowing through load resistances R2 and R3, 9B represents a driving element for controlling a driving current Id of the control element 9A, and 9C represents an operational amplifier inputting a reference voltage Vref applied to a positive terminal 9c and a monitor voltage Vm obtained by partially pressurizing an output voltage Vout applied to a negative terminal, through the load resistances R2 and R3, to control the amount of drive of the driving element 9B. In FIG. 5, reference numeral 10 designates an equivalent circuit of the high-frequency superposing circuit and 6b designates an operational amplifier in which a positive terminal is grounded and a negative terminal is connected through a resistance R4 to the upper electrode 6. By resistances R4 and R5 and the amplifier 6b, a current-voltage conversion is curried out and a voltage is output from a capacitance detecting output terminal 6a.

Subsequently, reference is made to the function of the above device. The high-voltage source 9a is a constant-voltage source of about 100 volts, and the reference voltage (Vref) source 9b has a variable voltage of approximately 5 volts. These voltages are applied to the external lead electrodes 4 and are fed to the voltage control circuit 9. The voltage of the high-frequency source 10b is superposed on the voltage of the constant-voltage source 10a controlled by the voltage control circuit 9 in accordance with the reference voltage Vref, and is applied to the control electrode 2, so that the profile of the reflecting surface is changed by electrostatic attraction produced between the control electrode 2 and the upper electrode 6. The amount of deformation (displacement) of the upper electrode and reflecting surface 6 can be controlled by changing the reference voltage Vref. The high-frequency voltage is caused to have a frequency much higher than a mechanical resonant frequency of the upper electrode and reflecting surface, and thereby a superposed high-frequency voltage has no influence on the amount of deformation (displacement).

In this case, the control electrode 2 and the upper electrode 6 become equivalent to a condenser, and the voltage of the high-frequency source 10b having a frequency much higher than the mechanical resonant frequency is superposed on the voltage of the constant-voltage source 10a by the high-frequency superposing circuit 10 and is applied between the electrodes. An electric current thus flows. The upper electrode 6 becomes equivalent to the case where it is grounded through the resistance R4. Specifically, a series circuit including the condenser composed of the control electrodes 2 and the upper electrode 6 and the resistance R4 is configured, and thus when the static capacitance of the condenser is changed, the amplitude and phase of the current flowing through the resistance R4 are varied. In other words, the static capacitance between the control electrode 2 and the upper electrode 6 can be found from a change of the amplitude or phase of the current. Since the static capacitance is inversely proportional to a distance between the control electrode 2 and the upper electrode 6, the result is that the distance between the electrodes, that is, the displacement of the reflecting surface, can be detected. Hence, the amount of deformation (displacement) of the reflecting surface 6 can be calculated from the amount of change of the static capacitance detected by the capacitance detecting output 6a of the capacitance detecting circuit 6A, and as a result, the profile of the reflecting surface 6 having been deformed can be always monitored.

According to this embodiment, the displacement of the reflecting surface alone can be detected in a non-contacting state, and thus there is the advantage that the profile of the reflecting surface is not entirely affected. Furthermore, since the reflecting surface does not require an additional structure, there is not any fear of causing strain to the reflecting surface. It is not necessary to use a laser displacer or another detector such as a impedance modulation detector, and therefore the device can be fabricated at low cost. Where the displacement is detected from a reflected image, an additional detecting mechanism must be provided in order to obtain and analyze the reflected image. According to the embodiment of the present invention, however, the displacement can be detected by the deformable mirror alone.

According to the embodiment, since the control electrode is also used as the capacitance (displacement) detecting electrode, detection can be made without changing the structure of the deformable mirror. Moreover, the high-frequency voltage for detecting the static capacitance is superposed on the constant voltage for deforming the reflecting surface so that the current is monitored through the resistance on the side of the upper electrode and reflecting surface and the static capacitance between the upper electrode and the control electrode, that is, the displacement of the reflecting surface, is detected by the phase and amplitude of the current. As such, the entire device can be simply constructed.

FIGS. 6A, 6B, 7, and 8 show the second embodiment of the present invention. In these figures, like numerals indicate like elements with respect to the above embodiment and their explanation is omitted.

Figure 8:
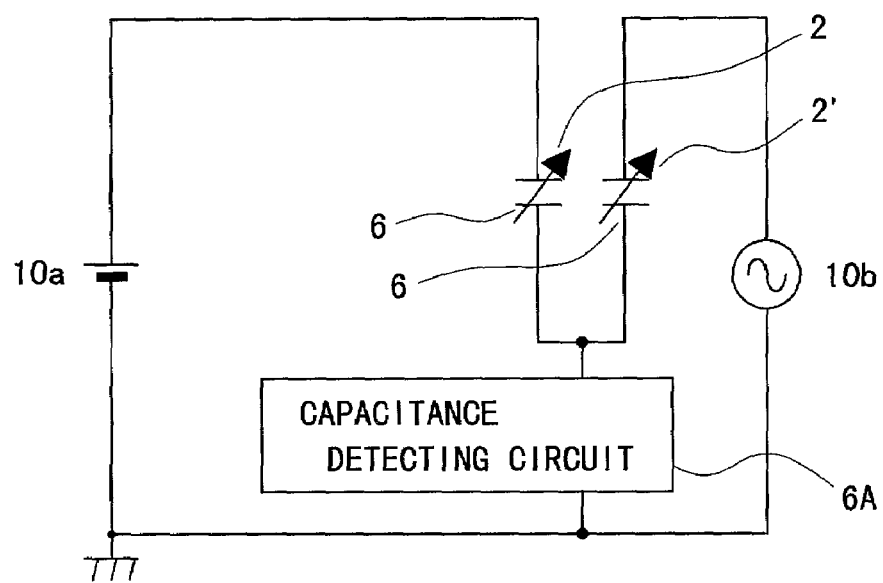
FIG. 8 is a diagram showing an equivalent circuit connecting individual elements where the constant-voltage source and the high-frequency source are separately constructed.

The second embodiment has the same structure as the first embodiment with the exception that the control electrode 2 and a capacitance detecting electrode 2' are separately configured as the same layer through the insulating film 1' on the lower substrate 1 (FIGS. 6A and 6B), and the constant-voltage source 10a and the high-frequency source 10b are integrally constructed (FIG. 7) or both are separately constructed (FIG. 8). Since the function of the second embodiment is the same as that of the first embodiment, its explanation is omitted. According to the second embodiment, only one capacitance detecting electrode 2' is configured and thereby the displacement of the capacitance detecting electrode 2' can be detected as a pinpoint, irrespective of the shape of the control electrode 2. Alternatively, there is the advantage that a plurality of capacitance detecting electrodes 2' are configured, to which high-frequency voltages are applied in turn, and thereby the displacements of a plurality of positions can be detected as pinpoints. Moreover, as shown in FIG. 8, when the constant-voltage source and the high-frequency source are separately constructed, the high-frequency superposing circuit can be eliminated and a simpler structure is obtained.

Figure 9A:
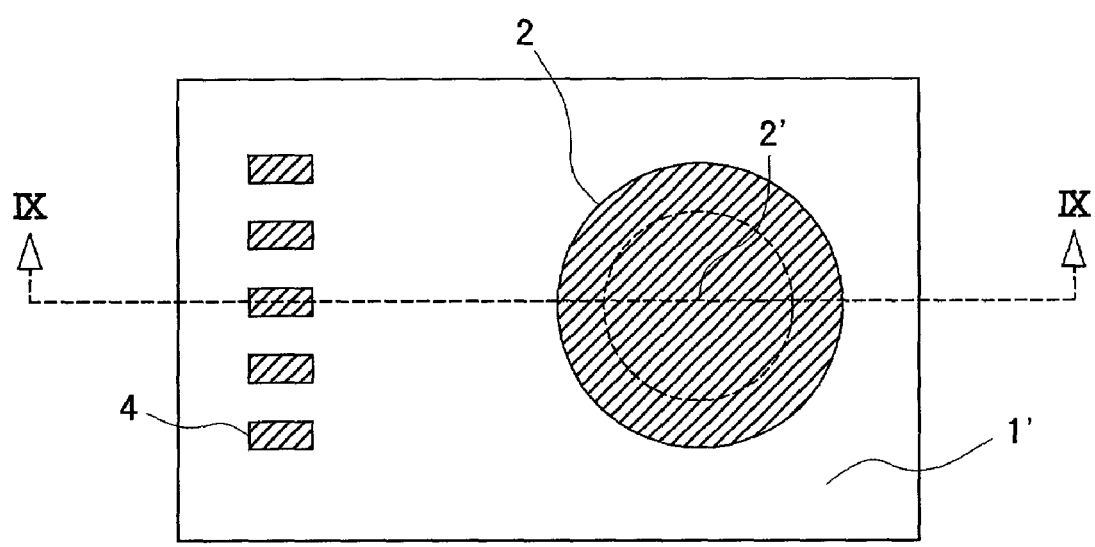
FIG. 9A is a plan view showing the lower substrate in a third embodiment of the present invention.
Figure 9B:
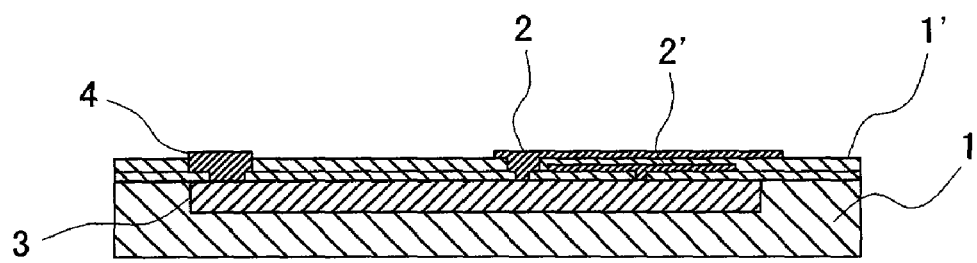
FIG. 9B is a sectional view taken along line IX—IX in FIG. 9A.
Figure 10:
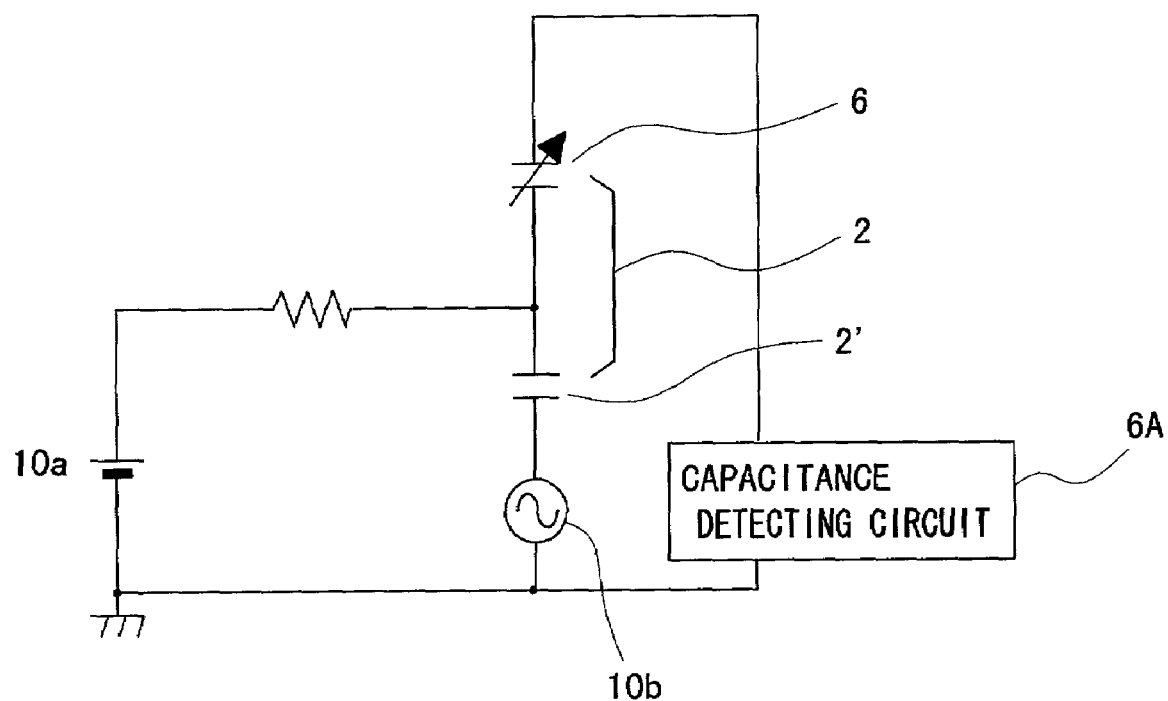
FIG. 10 is a diagram showing an equivalent circuit connecting individual elements in the third embodiment.

FIGS. 9A, 9B, and 10 show the third embodiment of the present invention. In these figures, like numerals indicate like elements with respect to the above embodiments and their explanation is omitted.

The third embodiment has the same structure as the above embodiments with the exception that the control electrode 2 and the capacitance detecting electrode 2' are separately configured as different layers through the insulating film 1' on the lower substrate 1 (FIGS. 9A and 9B), and the constant-voltage source 10a and the high-frequency source 10b are separately constructed and are connected in series (FIG. 10). In the third embodiment, the high voltage is applied through a resistance to the control electrode constituting the deformable mirror, and thus when the high-frequency voltage is applied to the capacitance detecting electrode 2', the potential of the control electrode is changed. This is monitored as a change of a current in the capacitance detecting circuit through the upper electrode. By the phase and amplitude of this current, the change of the static capacitance, namely the displacement of the reflecting surface, is detected. According to the third embodiment, since the constant-voltage source for deforming the reflecting surface and the high-frequency source for detecting the static capacitance are separately constructed, the high-voltage control circuit and the capacitance detecting circuit can be separated. As such, there is the advantage that the high-frequency superposing circuit can be eliminated, and as a result, a simpler structure is obtained to increase the number of degrees of circuitry freedom.

The deformable mirror, in addition to that which is driven by the electrostatic force already mentioned, is applicable to the method and apparatus of detecting the displacement of the reflecting surface in the present invention with respect to various deformable mirrors, variable focal-length lenses, and prisms to be described below.

For variable mirrors and prisms applicable to the method and means of detecting the displacement in the present invention, there are those which use electromagnet forces, those which utilize piezoelectric and electrostrictive effects, and those which are driven by a fluid. It is only necessary to provide a variable mirror, lens, or prism with electrodes for detecting the static capacitance if need arises. In addition to the deformable mirror, a variable focal-length mirror whose shape is not changed as will be shown in FIG. 36 falls within the category of the variable mirror.

Subsequently, a description will be given of examples of various constructions of the deformable mirror which is applicable to the detecting device of an optical surface in the present invention.

Figure 11:
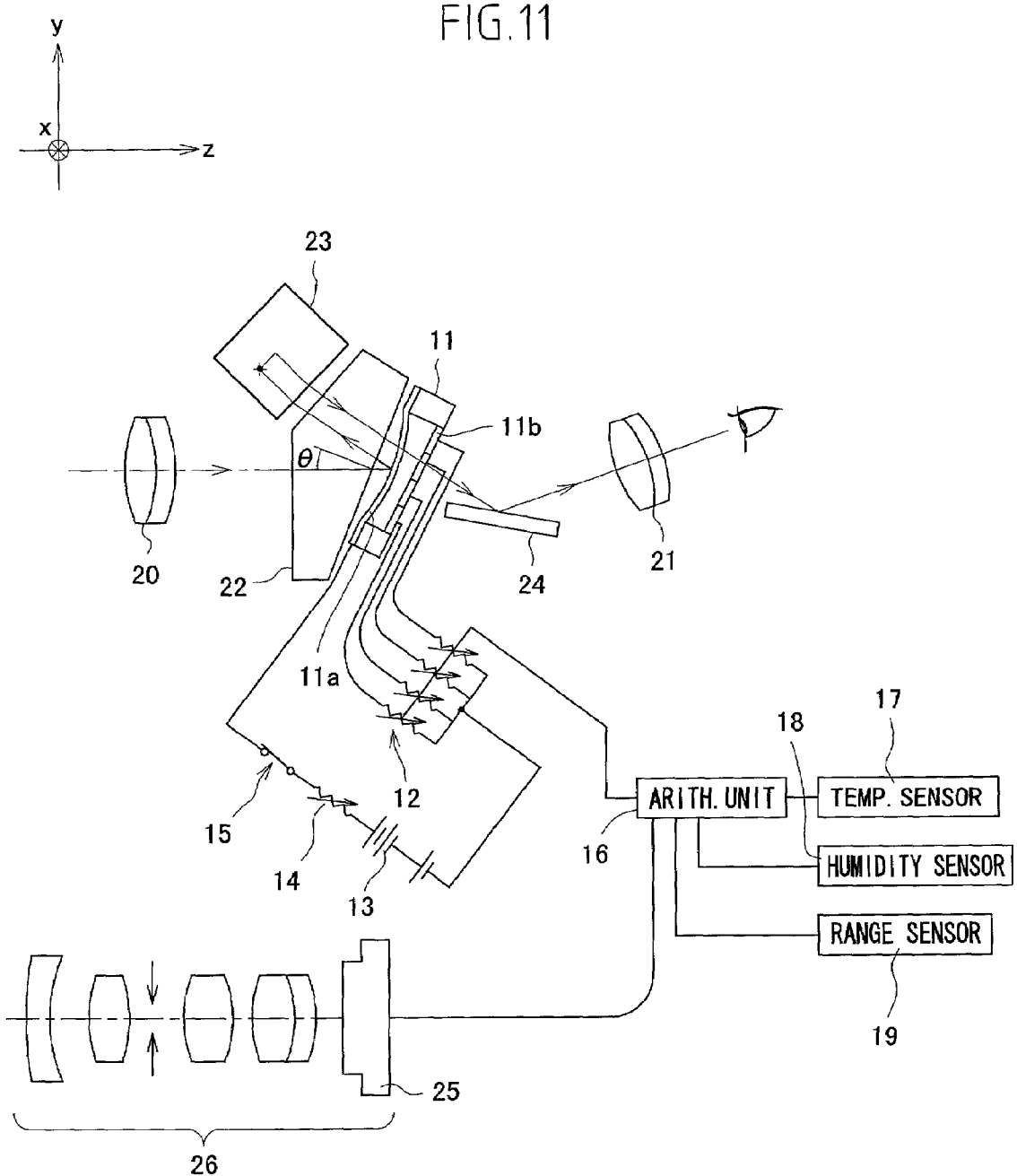
FIG. 11 is a view showing schematically a Keplerian finder for a digital camera using an optical-property mirror applicable to the present invention.

FIG. 11 shows a Keplerian finder for a digital camera using an example of the deformable mirror applicable to the present invention. It can, of course, be used for a silver halide film camera. Reference is first made to a deformable mirror 11.

The deformable mirror 11 refers to an optical-property deformable mirror (which is hereinafter simply called a deformable mirror) comprised of a thin film (reflecting surface) 11a coated with aluminum and a plurality of electrodes 11b. Reference numeral 12 denotes a plurality of variable resistors connected to the electrodes 11b; 13 denotes a power supply connected between the thin film 11a and the electrodes 11b through a variable resistors 14 and a power switch 15; 16 denotes an arithmetical unit for controlling the resistance values of the variable resistors 12; and 17, 18, and 19 denote a temperature sensor, a humidity sensor, and a range sensor, respectively, connected to the arithmetical unit 16, which are arranged as shown in the figure to constitute one optical apparatus.

Each of the surfaces of an objective lens 20, an eyepiece 21, a prism 22, an isosceles rectangular prism 23, a mirror 24, and the deformable mirror 11 need not necessarily be planar, and may have any shape such as a spherical or rotational symmetrical aspherical surface; a spherical, planar, or rotational symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

Figure 13:
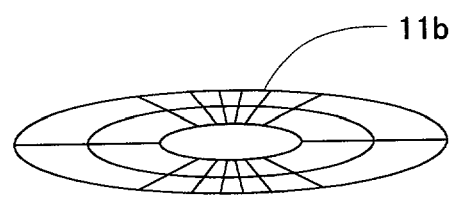
FIG. 13 is an explanatory view showing one aspect of electrodes used in the deformable mirror of FIG. 12.
Figure 14:
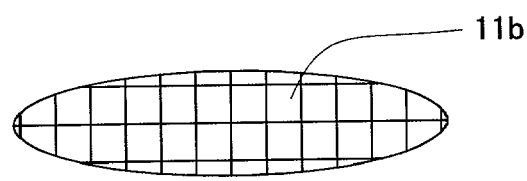
FIG. 14 is an explanatory view showing another aspect of electrodes used in the deformable mirror of FIG. 12.

The thin film 11a, like a membrane mirror set forth, for example, in "Handbook of Michrolithography, Michromachining and Michrofabrication", by P. Rai-Choudhury, Volume 2: Michromachining and Michrofabrication, p. 495, FIG. 8.58, SPIE PRESS, or Optics Communication, Vol. 140, pp. 187–190, 1997, is such that when the voltage is applied across the plurality of electrodes 11b, the thin film 11a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 20 and 21 and/or the prism 22, the isosceles rectangular prism 23, and a mirror 24, or the degradation of imaging performance by the expansion and deformation of a lens frame and assembly errors of parts, such as optical elements and frames. In this way, a focusing adjustment and correction for aberration produced by the focusing adjustment can be always properly made. Also, the configuration of the electrodes 11b, for instance, as illustrated in FIGS. 13 and 14, may be selected in accordance with the deformation of the thin film 11a.

According to the embodiment, light from an object is refracted by the entrance and exit surfaces of the objective lens 20 and the prism 22, and after being reflected by the deformable mirror 11, is transmitted through the prism 22. The light is further reflected by the isosceles rectangular prism 23 (in FIG. 11, a mark + on the optical path indicates that a ray of light travels toward the back side of the plane of the page), and is reflected by the mirror 24 to enter the eye through the eyepiece 21. As mentioned above, the lenses 20 and 21, the prisms 22 and 23, and the deformable mirror 11 constitute the observing optical system of the optical apparatus in the embodiment. The surface profile and thickness of each of these optical elements is optimized and thereby aberration can be minimized.

Specifically, the configuration of the thin film 11a, as the reflecting surface, is controlled in such a way that the resistance values of the variable resistors 14 are changed by signals from the arithmetical unit 16 to optimize imaging performance. Signals corresponding to ambient temperature and humidity and a distance to the object are input into the arithmetical unit 16 from the temperature sensor 17, the humidity sensor 18, and the range sensor 19. In order to compensate for the degradation of imaging performance due to the ambient temperature and humidity and the distance to the object in accordance with these input signals, the arithmetical unit 16 outputs signals for determining the resistance values of the variable resistors 14 so that voltages by which the configuration of the thin film 11a is determined are applied to the electrodes 11b. Thus, since the thin film 11a is deformed with the voltages applied to the electrodes 11b, that is, the electrostatic force, it assumes various shapes including an aspherical surface, according to circumstances, and can be set to a convex surface if the polarity of the applied voltage is changed. The range sensor 19 need not necessarily be used, and in this case, it is only necessary that an imaging lens 26 of the digital camera is moved so that a high-frequency component of an image signal from a solid-state image sensor 25 is roughly maximized, and the object distance is calculated from this position so that an observer's eye is able to focus upon the object image by deforming the deformable mirror.

When the thin film 11a is made of synthetic resin, such as polyimide, it can be considerably deformed even at a low voltage, which is advantageous. Also, the prism 22 and the deformable mirror 11 can be integrally configured into a unit.

Although not shown in the figure, the solid-state image sensor 25 may be constructed integrally with the substrate of the deformable mirror 11 by a lithography process.

When each of the lenses 20 and 21, the prisms 22 and 23, and the mirror 24 is configured by a plastic mold, an arbitrary curved surface of a desired configuration can be easily obtained and its fabrication is simple. In the photographing apparatus of the embodiment, the lenses 20 and 21 are arranged separately from the prism 22. However, if the prisms 22 and 23, the mirror 24, and the deformable mirror 11 are designed so that aberration can be eliminated without providing the lenses 20 and 21, the prisms 22 and 23 and the deformable mirror 11 will be configured as one optical block, and the assembly is facilitated. A part or all of the lenses 20 and 21, the prisms 22 and 23, and the mirror 24 may be made of glass. By doing so, a photographing apparatus with a higher degree of accuracy is obtained.

Also, although in FIG. 11 the arithmetical unit 16, the temperature sensor 17, the humidity sensor 18, and the range sensor 19 are provided so that the deformable mirror 11 compensates for the changes of the temperature, humidity, and the object distance, this is not necessarily required. That is, the arithmetical unit 16, the temperature sensor 17, the humidity sensor 18, and the range sensor 19 may be eliminated so that the deformable mirror 11 compensates for only a change of an observer's diopter.

Figure 12:
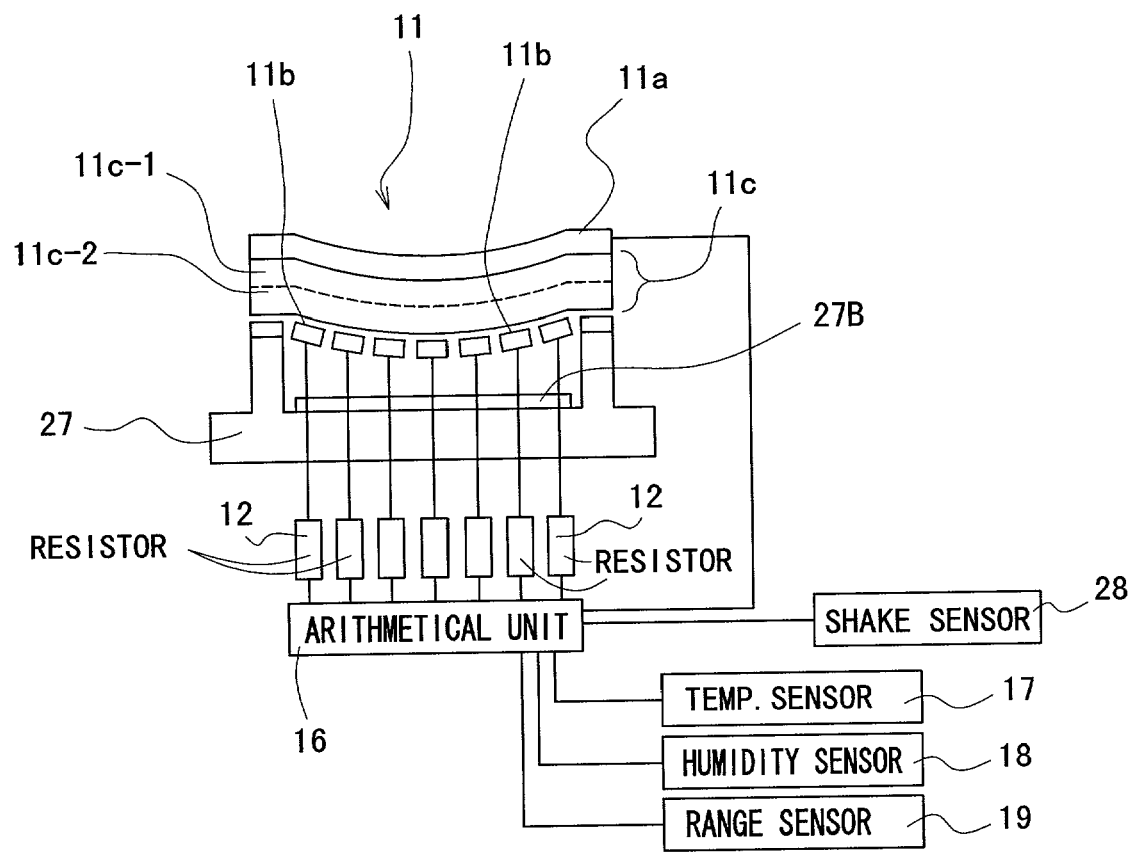
FIG. 12 is a view showing schematically another embodiment of the deformable mirror applicable to the present invention.

Subsequently, reference is made to other structures of the deformable mirror 11. FIG. 12 shows another embodiment of the deformable mirror 11 applicable to the present invention. In this embodiment, a piezoelectric element 11c is interposed between the thin film 11a and the electrodes 11b, and these are placed on a support 27. A voltage applied to the piezoelectric element 11c is changed in accordance with the individual electrodes 11b, and thereby the piezoelectric element 11c causes expansion or contraction which is partially different so that the shape of the thin film 11a can be changed. The configuration of the electrodes 11b, as illustrated in FIG. 13, may have a concentric division pattern, or as in FIG. 14, may be a rectangular division pattern. As other patterns, proper configurations can be chosen. In FIG. 12, reference numeral 28 represents a shake sensor connected to the arithmetical unit 16. The shake sensor 28, for example, detects the shake of a digital camera and changes the voltages applied to the electrodes 11b through the arithmetical unit 16 and the variable resistors 12 in order to deform the thin film 11a to compensate for the blurring of an image caused by the shake. At this time, the signals from the temperature sensor 17, the humidity sensor 18, and range sensor 19 are taken into account simultaneously, and focusing and compensation for temperature and humidity are performed. In this case, stress is applied to the thin film 11a by the deformation of the piezoelectric element 11c, and hence it is good practice to design the thin film 11a so that it has a moderate thickness and a proper strength.

Figure 15:
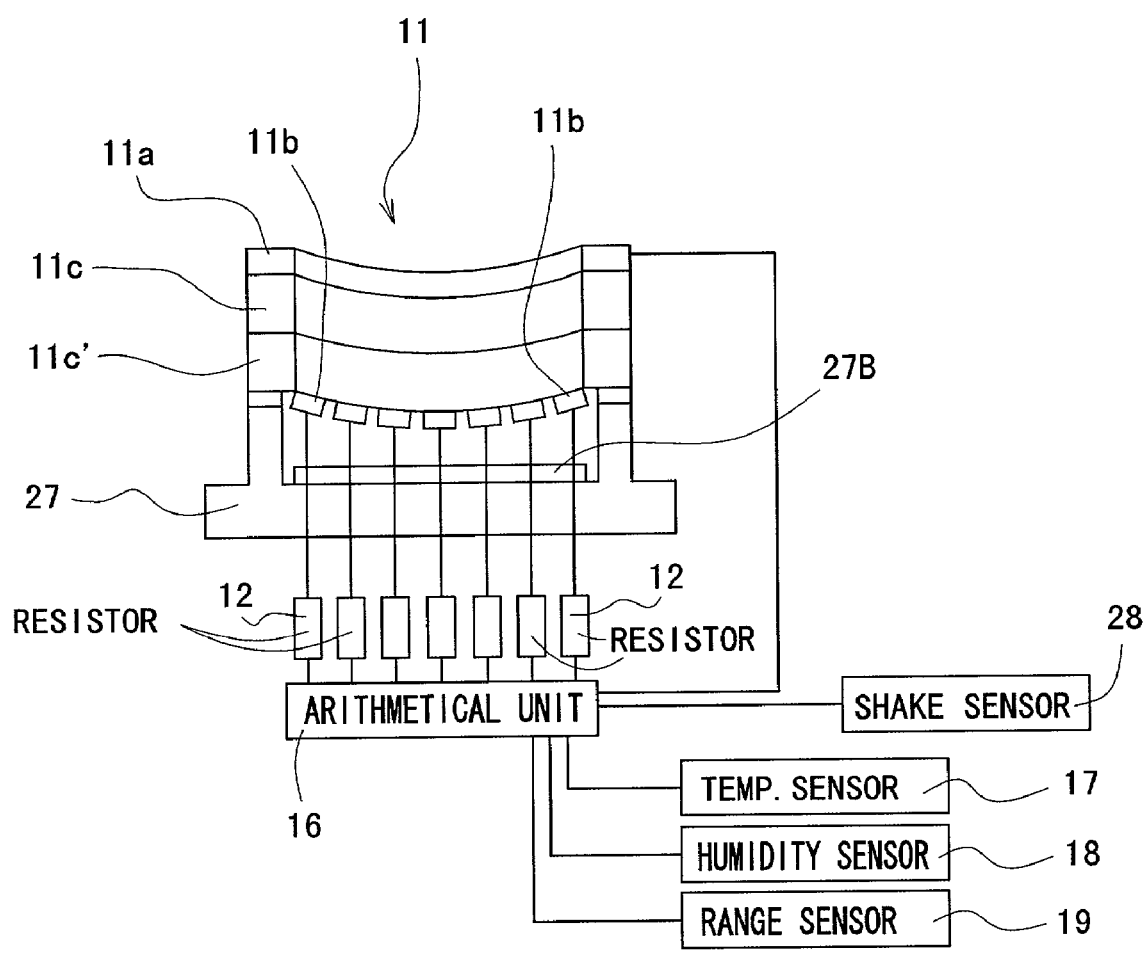
FIG. 15 is a view showing schematically another embodiment of the deformable mirror applicable to the present invention.

FIG. 15 shows another embodiment of the deformable mirror 11 applicable to the present invention. This embodiment has the same construction as the embodiment of FIG. 12 with the exception that two piezoelectric elements 11c and 11c' are interposed between the thin film 11a and the electrodes 11b and are made with substances having piezoelectric characteristics which are reversed in direction. Specifically, when the piezoelectric elements 11c and 11c' are made with ferroelectric crystals, they are arranged so that their crystal axes are reversed in direction with respect to each other. In this case, the piezoelectric elements 11c and 11c' expand or contract in a reverse direction when voltages are applied, and thus there is the advantage that a force for deforming the thin film 11a becomes stronger than in the embodiment of FIG. 12 and as a result, the shape of the mirror surface can be considerably changed.

For substances used for the piezoelectric elements 11c and 11c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When such a piezoelectric element is used, it is also possible to properly deform the thin film 11a if its thickness is made uneven.

For materials of the piezoelectric elements 11c and 11c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the deformable mirror surface, which is favorable.

When an electrostrictive substance, for example, acrylic elastomer or silicon rubber, is used for the piezoelectric element 11c shown in FIGS. 12 and 15, the piezoelectric element 11c, as indicated by a broken line in FIG. 12, may be constructed by cementing another substrate 11c-1 to an electrostrictive substance 11c-2.

In FIGS. 12 and 15, in order to detect the displacement of the deformable mirror, it is only necessary to place an electrode 27B on the support 27 as well and to detect the static capacitance between the electrodes 27B and 11b or between the electrode 27B and the thin film 11a.

Figure 16:
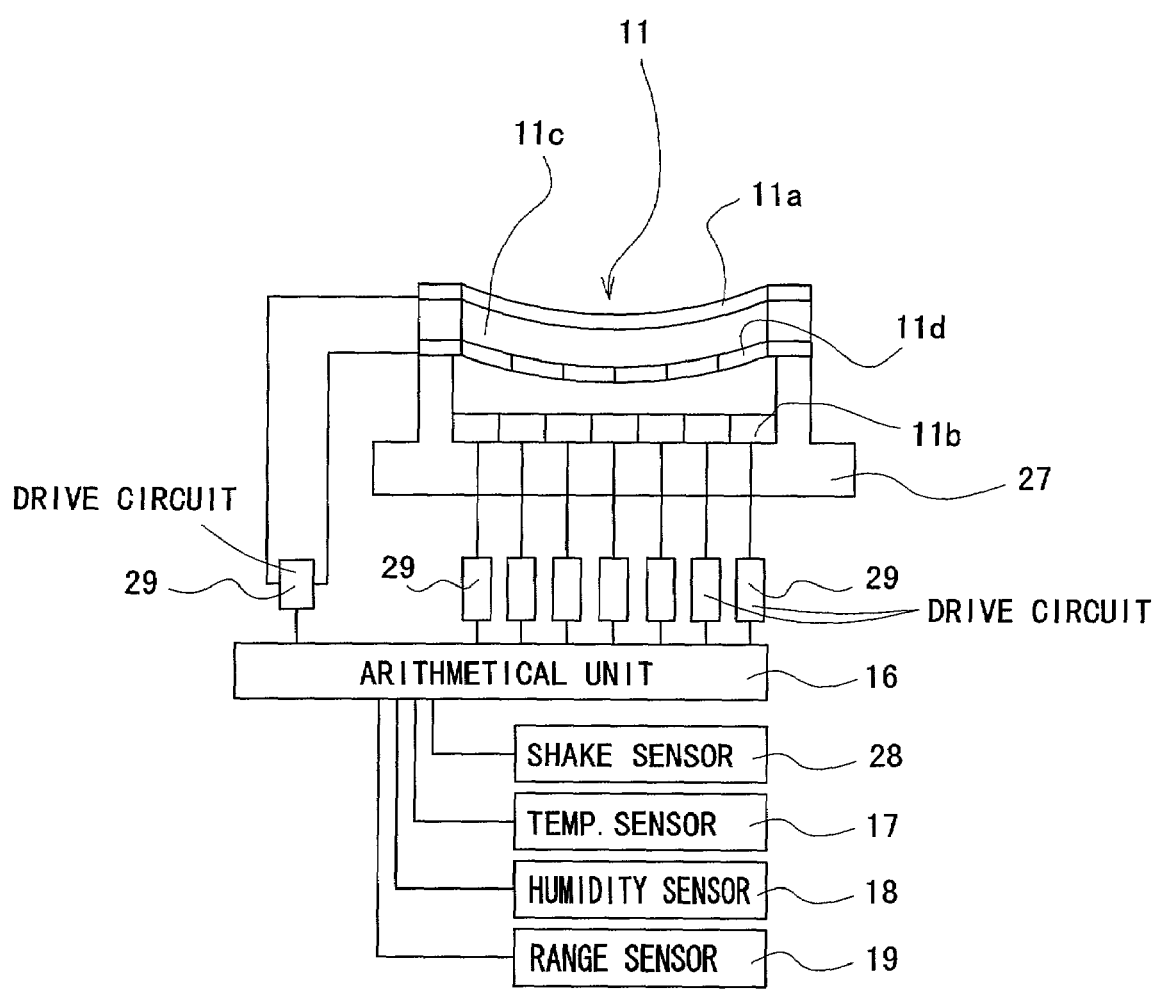
FIG. 16 is a view showing schematically another embodiment of the deformable mirror applicable to the present invention.

FIG. 16 shows another embodiment of the deformable mirror 11 applicable to the present invention. This embodiment is designed so that the piezoelectric element 11c is sandwiched between the thin film 11a and an electrode 11d, and voltages are applied between the thin film 11a and the electrode 11d through driving circuits 29 controlled by the arithmetical unit 16. Furthermore, voltages are also applied to the electrodes 11b provided on the support 27, through the driving circuits 29 controlled by the arithmetical unit 16. In this embodiment, therefore, the thin film 11a can be doubly deformed by electrostatic forces due to the voltages applied between the thin film 11a and the electrode 11d and applied to the electrodes 11b. There are advantages that various deformation patterns can be provided and the response is quick, compared with any of the above embodiments.

By changing the signs of the voltages applied between the thin film 11a and the electrode 11d, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 11d may be constructed as a plurality of electrodes like the electrodes 11b. This condition is shown in FIG. 16. In the present invention, all of the piezoelectric effect, the electrostrictive effect, and electrostriction are generally called the piezoelectric effect. Thus, it is assumed that the electrostrictive substance is included in the piezoelectric substance.

Figure 17:
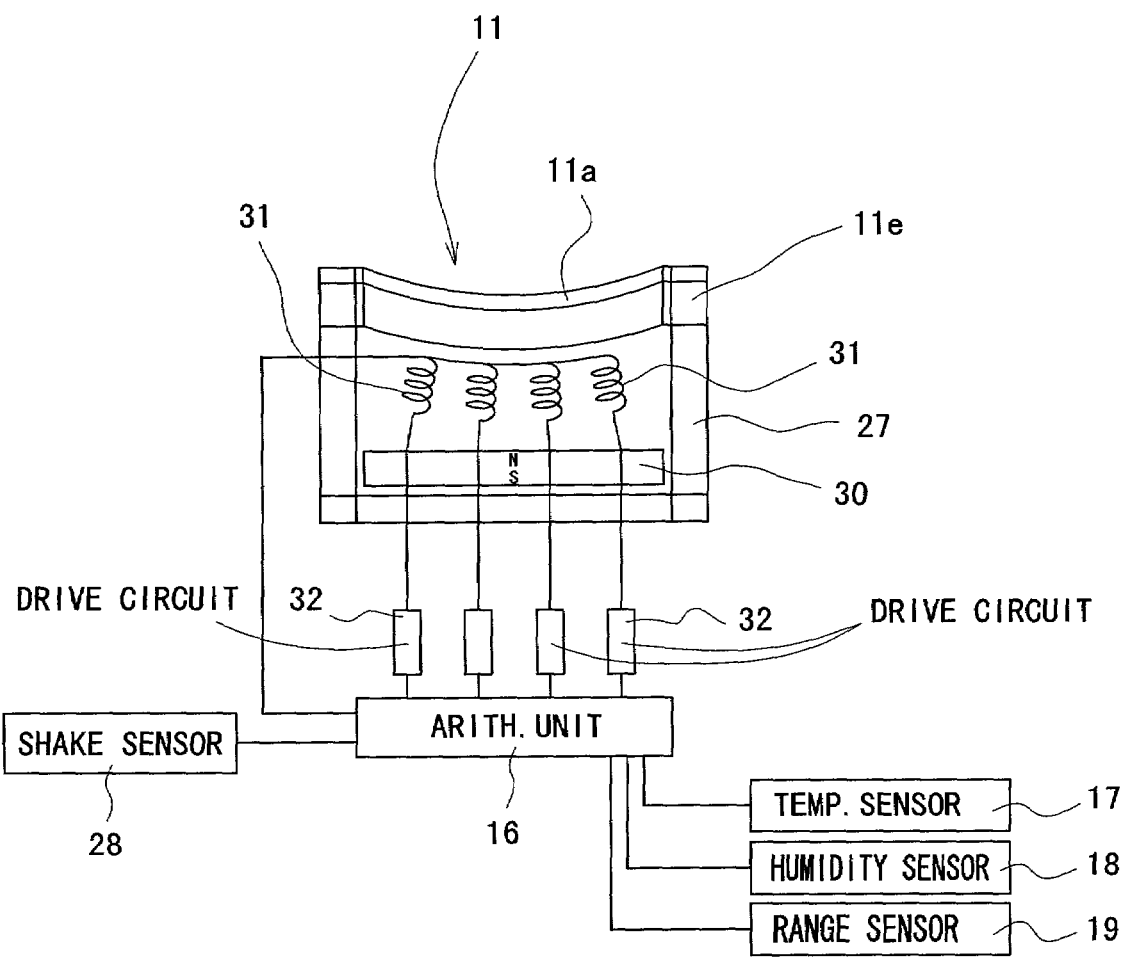
FIG. 17 is a view showing schematically another embodiment of the deformable mirror applicable to the present invention.

FIG. 17 shows another embodiment of the deformable mirror 11 applicable to the present invention. This embodiment is designed so that the shape of the reflecting surface can be changed by utilizing an electromagnetic force. A permanent magnet 30 mounted and fixed on a bottom surface inside the support 27, and the periphery of a substrate 11e made with silicon nitride or polyimide is mounted on the top surface thereof. The thin film 11a consisting of the coating of metal, such as aluminum, is deposited on the surface of the substrate 11e, thereby constituting the deformable mirror 11. Below the substrate 11e, a plurality of coils 31 are arranged and connected to the arithmetical unit 16 through driving circuits 32. In accordance with output signals from the arithmetical unit 16 corresponding to changes of the optical system obtained at the arithmetical unit 16 by signals from the sensor 17, 18, 19, and 28, proper electric currents are supplied from the driving circuits 32 to the coils 31. At this time, the coils 31 are repelled or attracted by the electromagnetic force with the permanent magnet 30 to deform the substrate 11e and the thin film 11a.

In this case, a different amount of current can also be caused to flow through each of the coils 31. A single coil 31 may be used, and the permanent magnet 30 may be provided on the substrate 11e so that the coils 31 are arranged on the bottom side in the support 27. It is desirable that the coils 31 are fabricated by a lithography process. A ferromagnetic core (iron core) may be encased in each of the coils 31.

Figure 18:
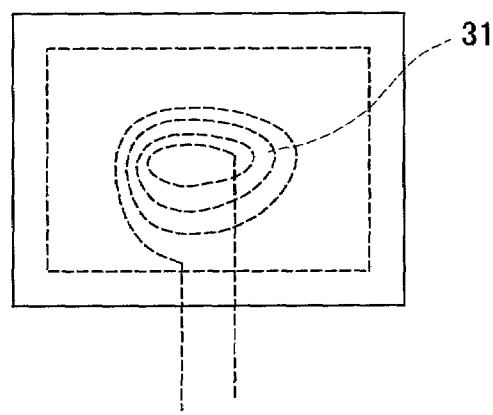
FIG. 18 is an explanatory view showing the winding density of a thin-film coil in the deformable mirror of FIG. 17.

In this case, each of the coils 31, as illustrated in FIG. 18, can be designed so that a coil density varies with place and thereby a desired deformation is brought to the substrate 11e and the thin film 11a. A single coil 31 may be used, and a ferromagnetic core (iron core) may be encased in each of the coils 31.

In FIG. 17, by detecting the static capacitance between the coils 31 and the permanent magnet 30, the displacement of the thin film 11a can be found.

Figure 19:
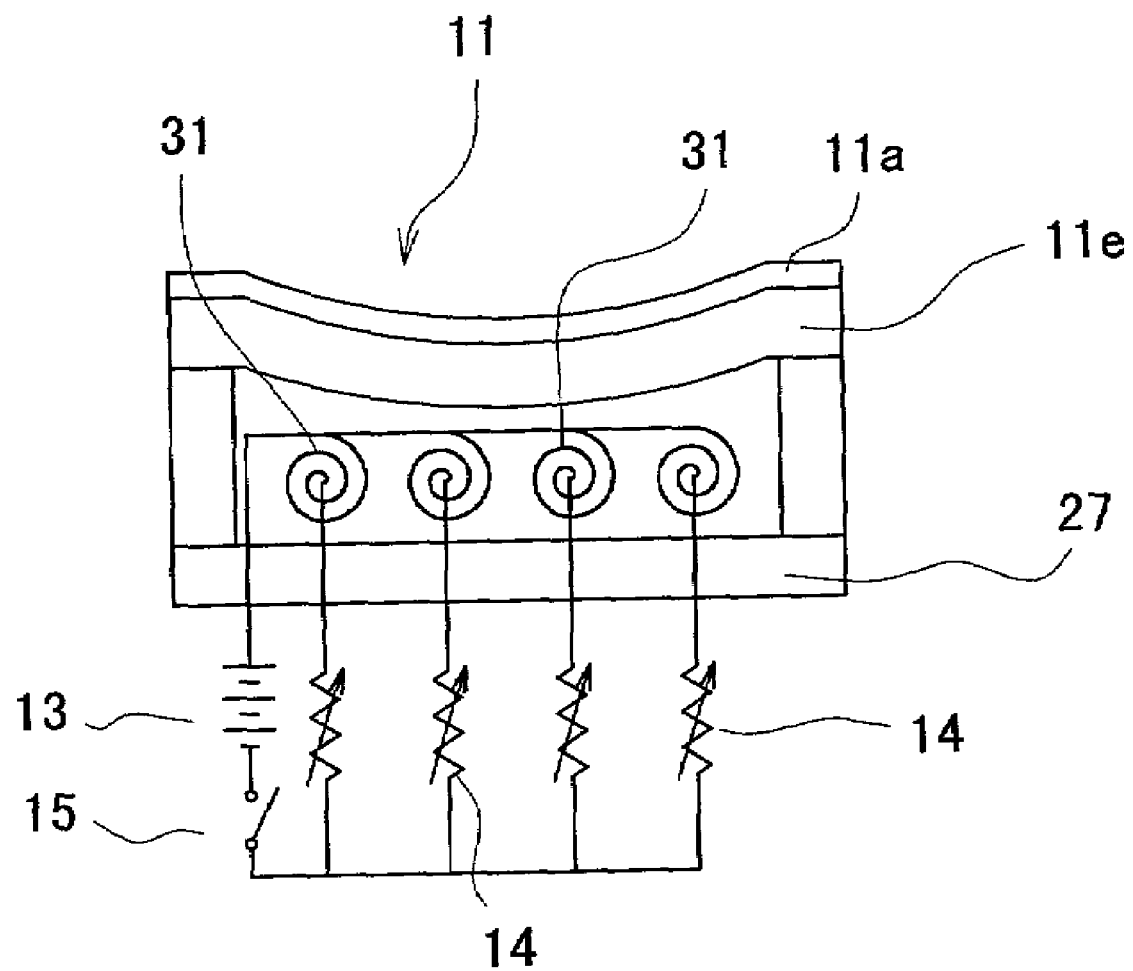
FIG. 19 is a view showing schematically another embodiment of the deformable mirror applicable to the present invention.
Figure 20:
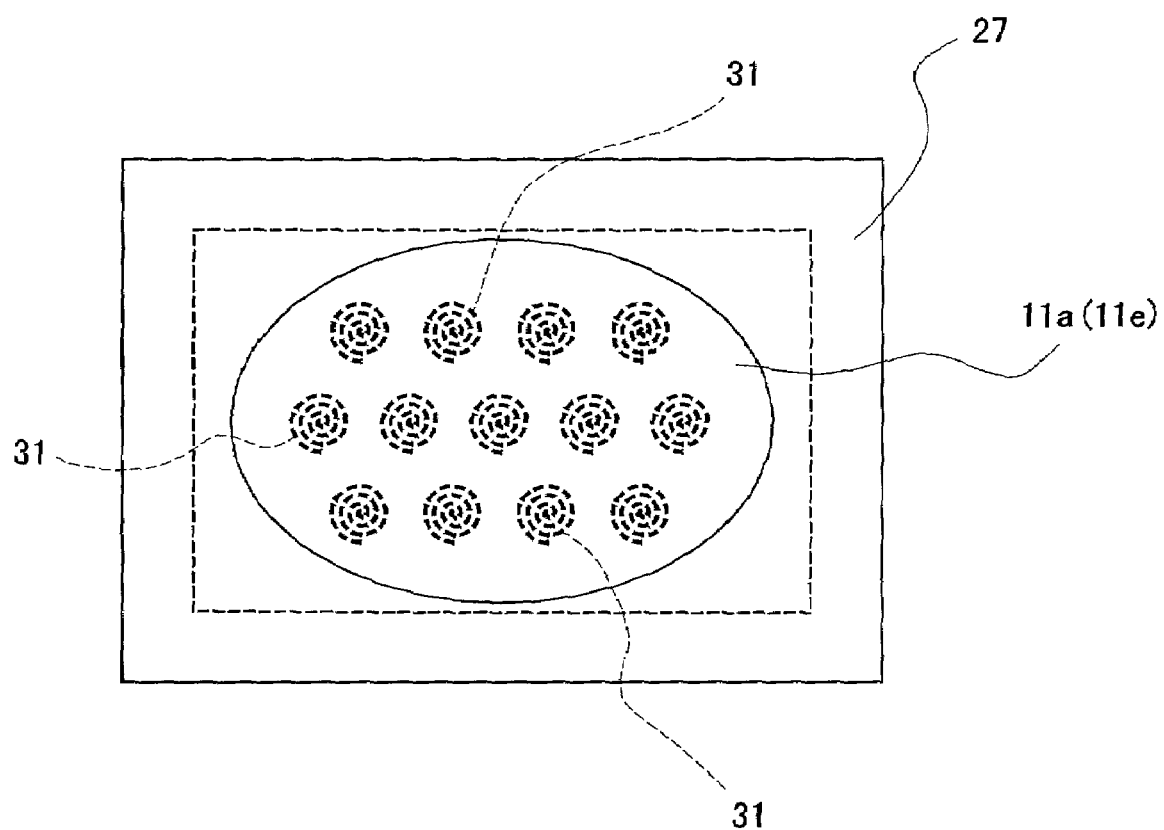
FIG. 20 is an explanatory view showing an example of an array of coils in the deformable mirror of FIG. 19.
Figure 21:
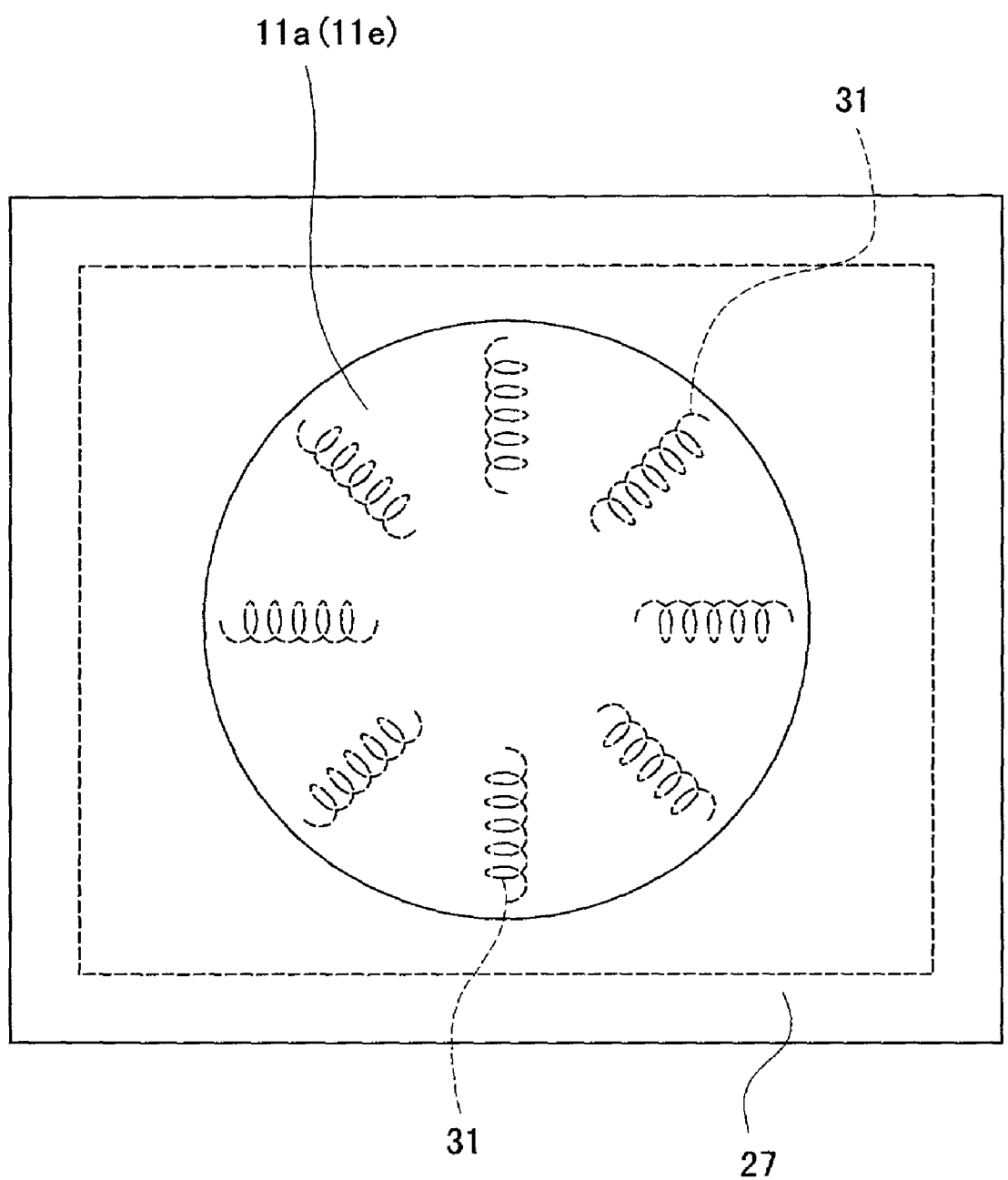
FIG. 21 is an explanatory view showing another example of the array of coils in the deformable mirror of FIG. 19.
Figure 22:
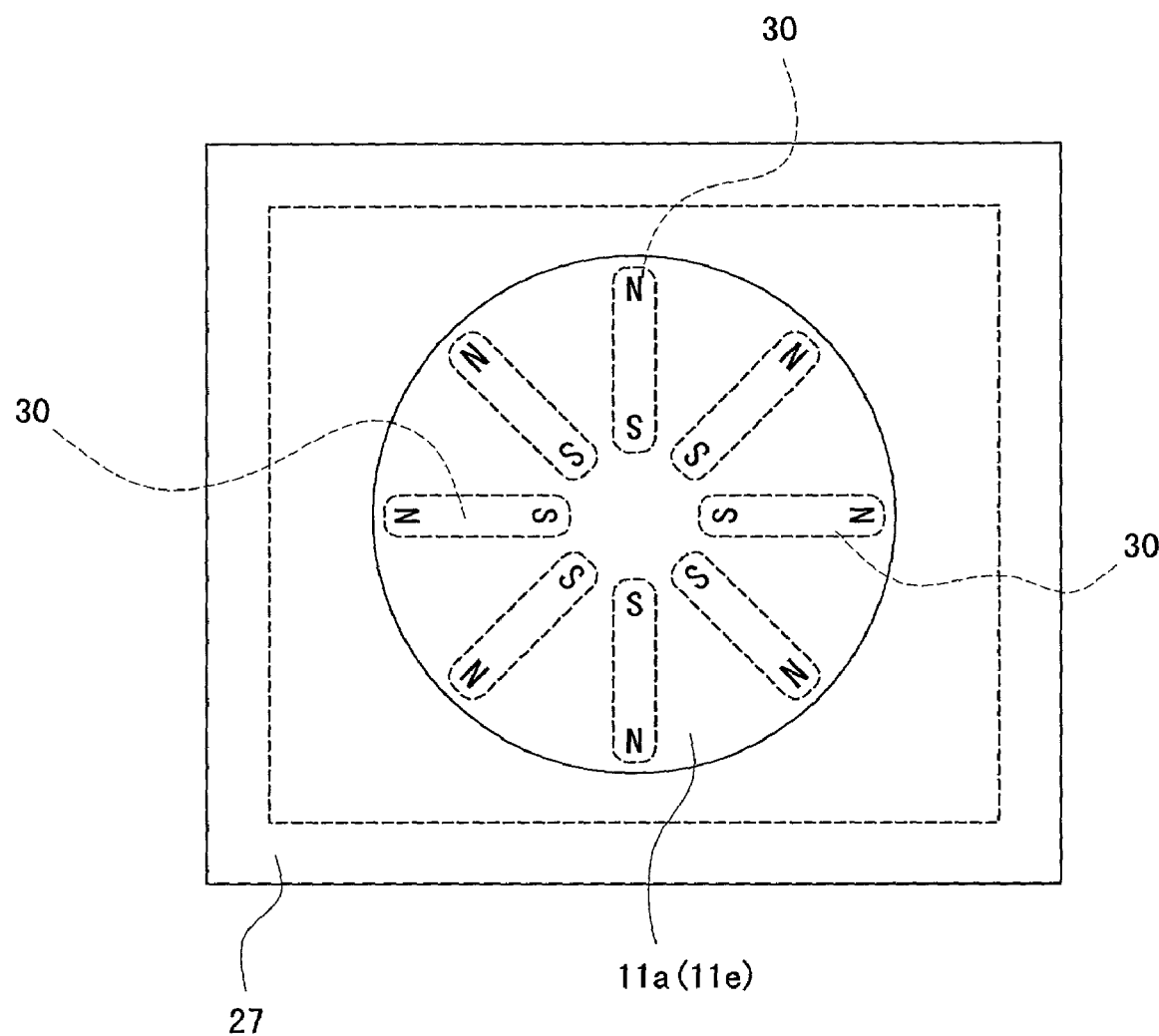
FIG. 22 is an explanatory view showing an array of permanent magnets suitable for the array of coils of FIG. 21 in the example of FIG. 19.

FIG. 19 shows another embodiment of the deformable mirror 11 applicable to the present invention. In this embodiment, the substrate 11e is made with a ferromagnetic such as iron, and the thin film 11a as a reflecting film is made with aluminum. In this case, since the thin film coils need not be used, the structure is simple and the manufacturing cost can be reduced. If the power switch 15 is replaced with a changeover and power on-off switch, the directions of currents flowing through the coils 31 can be changed, and the configuration of the substrate 11e and the thin film 11a can be changed at will. FIG. 20 shows an array of the coils 31 in this embodiment, and FIG. 21 shows another array of the coils 31. These arrays are also applicable to the embodiment of FIG. 17. FIG. 22 shows an array of the permanent magnets 30 suitable for the array of the coils of FIG. 21 in the embodiment of FIG. 17. Specifically, when the permanent magnets 30, as shown in FIG. 22, are radially arranged, a delicate deformation can be provided to the substrate 11e and the thin film 11a in contrast with the embodiment of FIG. 17. As mentioned above, when the electromagnetic force is used to deform the substrate 11e and the thin film 11a (in the embodiments of FIGS. 17 and 19), there is the advantage that they can be driven at a lower voltage than in the case where the electrostatic force is used.

In FIG. 19, by detecting the static capacitance between the substrate 11e and the coils 31, the displacement of the thin film 11a can be found.

Some embodiments of the deformable mirror have been described, but as shown in FIG. 16, at least two kinds of forces may be used in order to deform the shape of the reflecting surface. Specifically, at least two of the electrostatic force, electromagnetic force, piezoelectric effect, magnetostriction, pressure of a fluid, electric field, magnetic field, temperature change, and electromagnetic wave, may be used simultaneously to deform the reflecting surface of the deformable mirror. That is, when at least two different driving techniques are used to make the variable optical-property element, a considerable deformation and a slight deformation can be realized simultaneously and a mirror surface with a high degree of accuracy can be obtained.

Figure 23:
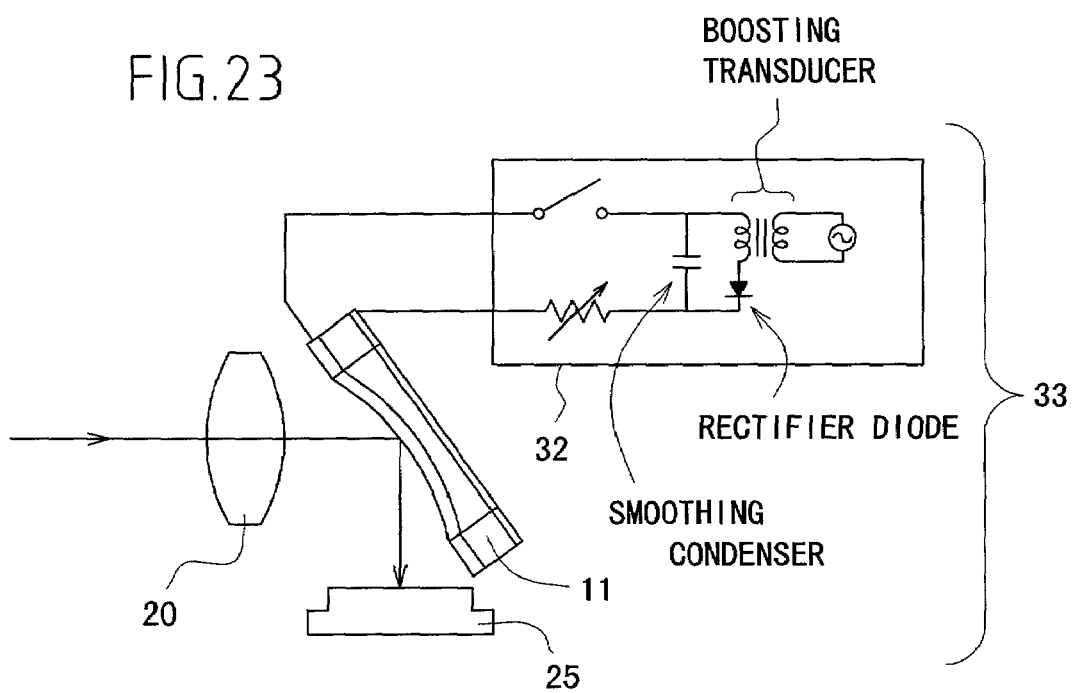
FIG. 23 is a view showing schematically an imaging system which uses the deformable mirror applicable to the present invention.

FIG. 23 shows an imaging system which uses the deformable mirror 11 applicable to the present invention, and which is used, for example, in a digital camera of a cellular phone, a capsule endoscope, an electronic endoscope, a digital camera for personal computers, or a digital camera for PDAs.

In the imaging system of this embodiment, one imaging unit 33 is constructed with the deformable mirror 11, the lens 20, the solid-state image sensor 25, and a control system 32. In the imaging unit 33 of the embodiment, light from an object passing through the lens 20 is condensed by the deformable mirror 11 and is imaged on the solid-state image sensor 25. The deformable mirror 11 is a kind of variable optical-property element and is also referred to as the variable focal-length mirror.

According to this embodiment, even when the object distance is changed, the deformable mirror 11 is deformed and thereby the object can be brought into a focus. The embodiment need not use the motor to move the lens and excels in compact and lightweight design and low power consumption. The imaging unit 33 can be used in any of the embodiments as the imaging system of the present invention. When a plurality of deformable mirrors 11 are used, a zoom or variable magnification imaging system or optical system can be constructed.

In FIG. 23, an example of a control system which includes the boosting circuit of a transformer using coils in the control system 32 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Figure 24:
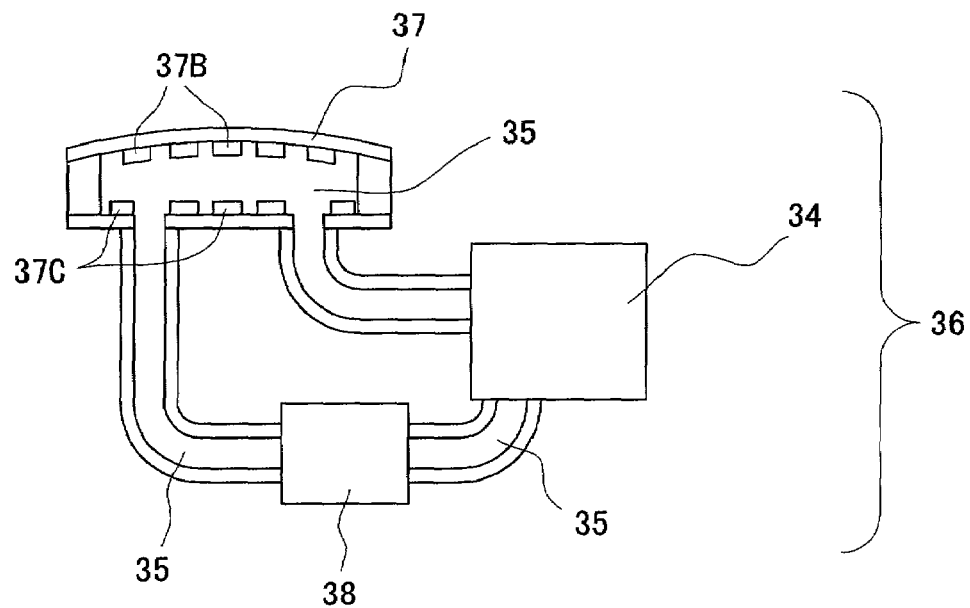
FIG. 24 is a view showing schematically another embodiment of the deformable mirror applicable to the present invention.

FIG. 24 shows a deformable mirror 36 in which a fluid 35 is taken in and out by a micropump 34 to deform a mirror surface, in another embodiment of the deformable mirror applicable to the present invention. According to this embodiment, there is the merit that the mirror surface can be considerably deformed.

The micropump 34 is a small-sized pump, for example, made by a micromachining technique and is constructed so that it is operated with an electric power. The fluid 35 is sandwiched between a reflecting film 37 and the substrate. Reference numeral 38 denotes a liquid tank. As examples of pumps made by the micromachining technique, there are those which use thermal deformations, piezoelectric substances, and electrostatic forces.

In FIG. 24, by detecting the static capacitance between electrodes 27B provided adjacent to the reflecting film 37 and electrodes 37c provided in the substrate, the displacement of the reflecting film 37 can be found.

Figure 25:
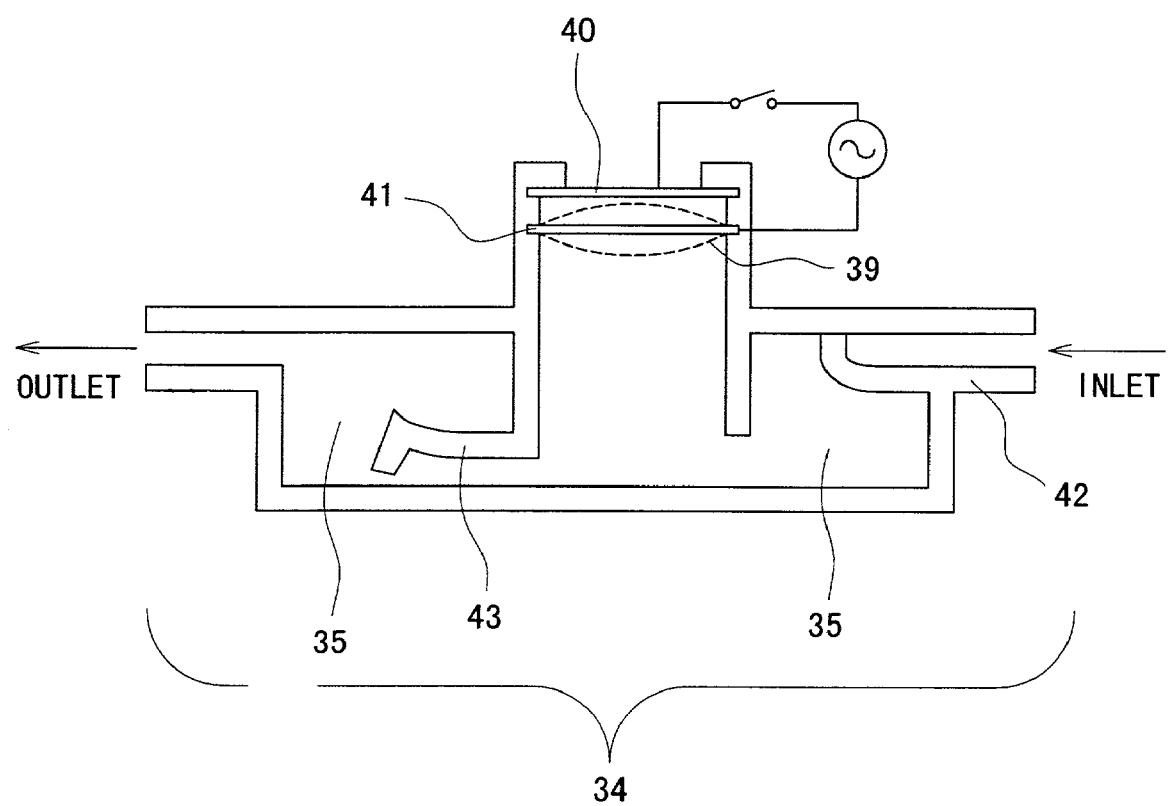
FIG. 25 is a view showing schematically an example of a micropump in FIG. 24.

FIG. 25 shows an example of the micropump 34. In the micropump 34, a vibrating plate 39 is vibrated by the electrostatic force or the electric force of the piezoelectric effect. In this figure, a case where the vibrating plate is vibrated by the electrostatic force is shown and reference numerals 40 and 41 represent electrodes. Dotted lines indicate the vibrating plate 39 where it is deformed. When the vibrating plate 39 is vibrated, two valves 42 and 43 are opened and closed to feed the fluid 35 from the right to the left.

In the deformable mirror 36 of this embodiment, the reflecting film 37 is deformed into a concave or convex surface in accordance with the amount of the fluid 35, and thereby the deformable mirror functions. The deformable mirror 36 is driven by the fluid 35. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 23, it is desirable that the boosting transformer or the piezoelectric transformer is used to constitute the control system.

If the thin film 11a for reflection is also provided in a portion which is not deformed, it can be used as a reference surface when the profile of the deformable mirror is measured by an interferometer, which is convenient.

Figure 26:
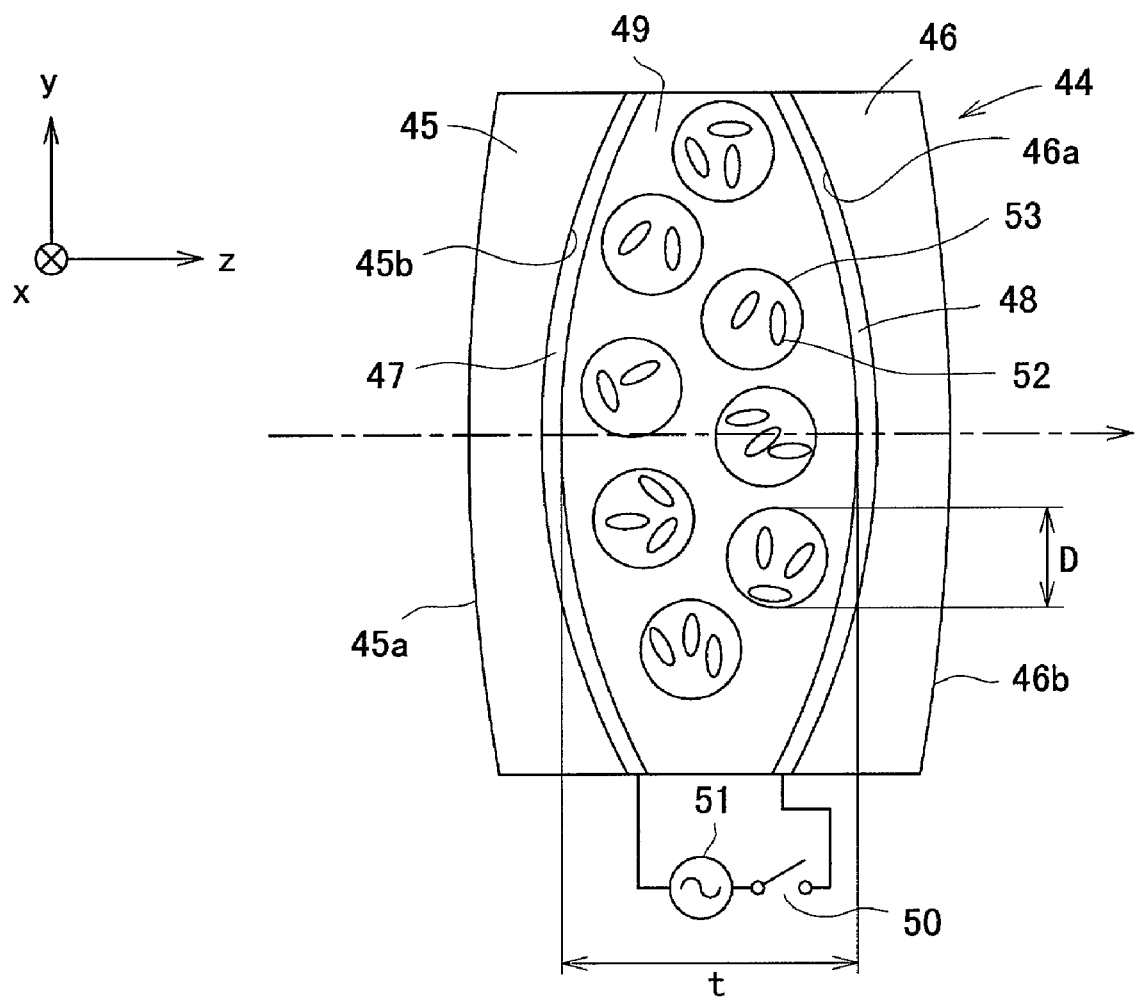
FIG. 26 is a view showing the principle of an example of a variable focal-length lens applicable to the present invention.

Subsequently, reference is made to the variable focal-length lens applicable to the present invention. In FIG. 26, a variable focal-length lens 44 includes a first lens 45 having lens surfaces 45a and 45b as a first surface and a second surface, respectively, a second lens 46b having lens surfaces 46a and 46b as a third surface and a fourth surface, respectively, and a macromolecular dispersed liquid crystal layer 49 sandwiched between these lenses through transparent electrodes 47 and 48. Incident light is converged through the first and second lenses 45 and 46. The transparent electrodes 47 and 48 are connected to an alternating-current power supply 51 through a switch 50 so that an alternating-current electric field is selectively applied to the macromolecular dispersed liquid crystal layer 49. The macromolecular dispersed liquid crystal layer 49 is composed of a great number of minute macromolecular cells 53, each having any shape, such as a sphere or polyhedron, and including liquid crystal molecules 52, and its volume is equal to the sum of volumes occupied by macromolecules and the liquid crystal molecules 52 which constitute the macromolecular cells 53.

Here, for the size of each of the macromolecular cells 53, for example, in the case of a sphere, when an average diameter is denoted by D and the wavelength of light used is denoted by $\lambda$, the average diameter D is chosen to satisfy the following condition:

$$2\ nm \leq D \leq \lambda/5 \tag{1}$$

That is, the size of each of the liquid crystal molecules 52 is at least about 2 nm and thus the lower limit of the average diameter D is set to about 2 nm or larger. The upper limit of the diameter D depends on a thickness t of the macromolecular dispersed liquid crystal layer 49 in the direction of the optical axis of the variable focal-length lens 44. However, if the diameter is larger than the wavelength $\lambda$, a difference between the refractive indices of the macromolecules and the liquid crystal molecules 52 will cause light to be scattered at the interfaces of the macromolecular cells 53 and will render the liquid crystal layer 49 opaque. Hence, the upper limit of the diameter D should be $\lambda/5$ or less. A high degree of accuracy is not necessarily required, depending on an optical product using the variable focal-length lens. In this case, the diameter D below the value of the wavelength $\lambda$ is satisfactory. Also, the transparency of the macromolecular dispersed liquid crystal layer 49 deteriorates with increasing thickness t.

Figure 27:
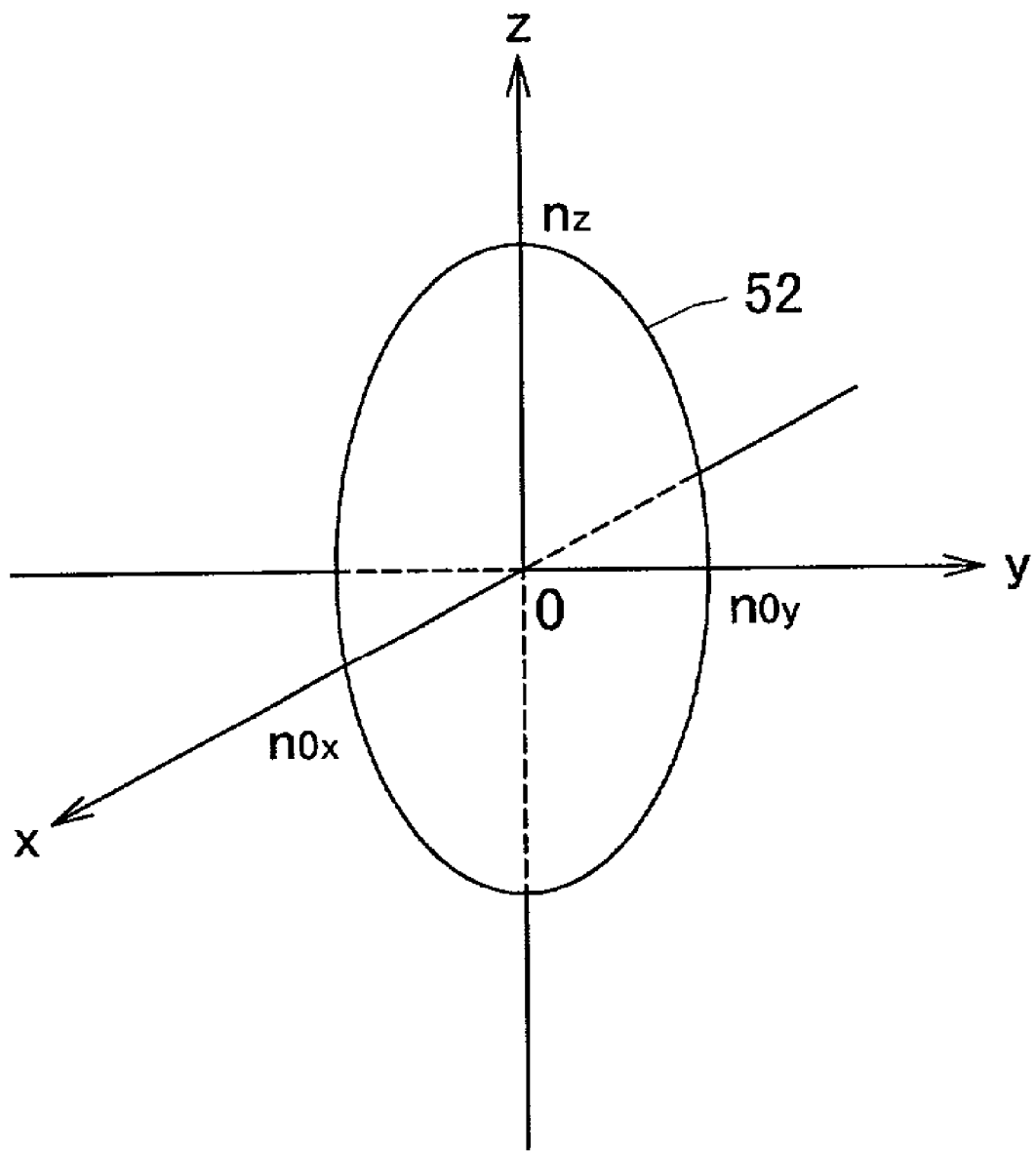
FIG. 27 is a view showing the index ellipsoid of a nematic liquid crystal of uniaxial anisotropy.

In the liquid crystal molecules 52, for example, uniaxial nematic liquid crystal molecules are used. The index ellipsoid of each of the liquid crystal molecules 52 is as shown in FIG. 27. That is, $$n_{ox} = n_{oy} = n_o \tag{2}$$

where $n_o$ is the refractive index of an ordinary ray and $n_{ox}$ and $n_{oy}$ are refractive indices in directions perpendicular to each other in a plane including ordinary rays.

Figure 28:
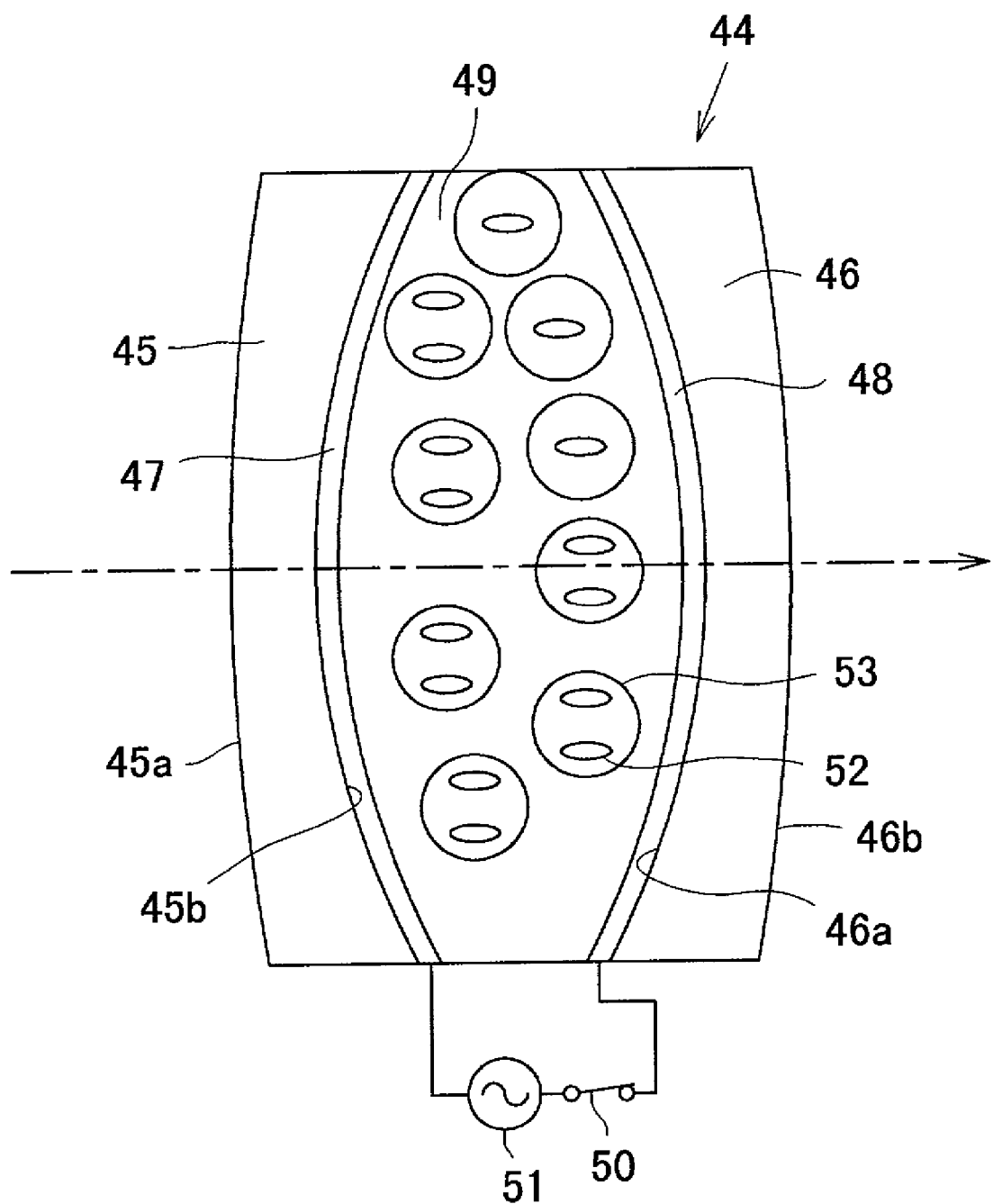
FIG. 28 is a view showing a state where an electric field is applied to a macromolecular dispersed liquid crystal layer in FIG. 26.

Here, in the case where the switch 50, as shown in FIG. 26 is turned off, that is, the electric field is not applied to the liquid crystal layer 49, the liquid crystal molecules 52 are oriented in various directions, and thus the refractive index of the liquid crystal layer 49 relative to incident light becomes high to provide a lens with strong refracting power. In contrast to this, when the switch 50, as shown in FIG. 28, is turned on and the alternating-current electric field is applied to the liquid crystal layer 49, the liquid crystal molecules 52 are oriented so that the major axis of the index ellipsoid of each liquid crystal molecule 52 is parallel with the optical axis of the variable focal-length lens 44, and hence the refractive index becomes lower to provide a lens with weaker refracting power.

Figure 29:
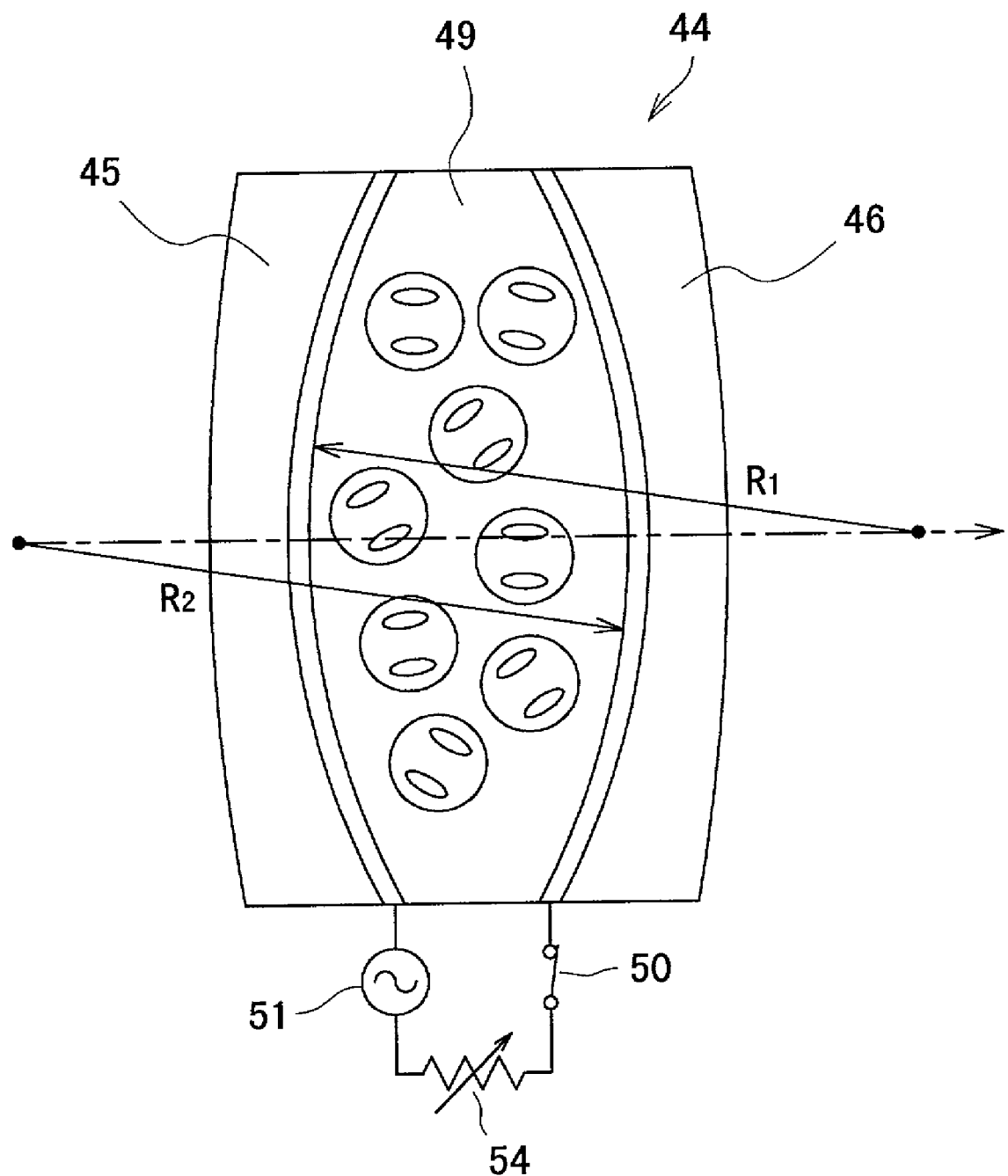
FIG. 29 is a view showing one example where a voltage applied to the macromolecular dispersed liquid crystal layer in FIG. 26 can be changed.

The voltage applied to the macromolecular dispersed liquid crystal layer 49, for example, as shown in FIG. 29, can be changed stepwise or continuously by a variable resistor 54. By doing so, as the applied voltage becomes high, the liquid crystal molecules 52 are oriented so that the major axis of the index ellipsoid of each liquid crystal molecule 52 becomes progressively parallel with the optical axis of the variable focal-length lens 44, and thus the refractive index can be changed stepwise or continuously.

Here, in the case of FIG. 26, that is, in the case where the electric field is not applied to the macromolecular dispersed liquid crystal layer 49, when the refractive index in the direction of the major axis of the index ellipsoid, as shown in FIG. 27, is denoted by $n_z$, an average refractive index $n_{LC}'$ of the liquid crystal molecules 52 is roughly given by $$(n_{ox}+n_{oy}+n_z)/3 = n_{LC}' \quad (3)$$

Also, when the refractive index $n_z$ is expressed as a refractive index $n_e$ of an extraordinary ray, an average refractive index $n_{LC}$ where Equation (2) is established is given by $$(2n_o+n_e)/3 = n_{LC} \quad (4)$$

In this case, when the refractive index of each of the macromolecules constituting the macromolecular cells 53 is represented by $n_p$ and the ratio of volume between the liquid crystal layer 49 and the liquid crystal molecules 52 is represented by ff, a refractive index $n_A$ of the liquid crystal layer 49 is given from the Maxwell-Garnet's law as $$n_A = f\!f \cdot n_{LC}' + (1-f\!f)n_p \quad (5)$$

Thus, as shown in FIG. 29, when the radii of curvature of the inner surfaces of the lenses 45 and 46, that is, the surfaces on the side of the liquid crystal layer 49, are represented by $R_1$ and $R_2$, a focal length $f_1$ of the variable focal-length lens 44 is given by $$1/f_1 = (n_A-1)(1/R_1 - 1/R_2) \quad (6)$$

Also, when the center of curvature is located on the image side, it is assumed that the radius of curvature $R_1$ or $R_2$ is positive. Refraction caused by the outer surface of each of the lenses 45 and 46 is omitted. That is, the focal length of the lens of only the liquid crystal layer 49 is given by Equation (6).

When the average refractive index of ordinary rays is expressed as $$(n_{ox}+n_{oy})/2 = n_o' \quad (7)$$

a refractive index $n_B$ of the liquid crystal layer 49 in the case of FIG. 28, namely, in the case where the electric field is applied to the liquid crystal layer 49, is given by $$n_B = f\!f \cdot n_o' + (1-f\!f)n_p \quad (8)$$

and thus a focal length $f_2$ of the lens of only the liquid crystal layer 49 in this case is given by $$1/f_2 = (n_B-1)(1/R_1 - 1/R_2) \quad (9)$$

Also, the focal length where a lower voltage than in FIG. 28 is applied to the liquid crystal layer 49 is a value between the focal length $f_1$ given by Equation (6) and the focal length $f_2$ by Equation (9).

From Equations (6) and (9), a change rate of the focal length by the liquid crystal layer 49 is given by $$|(f_2-f_1)/f_2| = |(n_B-n_A)/(n_B-1)| \quad (10)$$

Thus, in order to increase the change rate, it is only necessary to increase the value of $|(n_B-n_A)|$. Here, $$n_B - n_A = f\!f(n_o' - n_{LC}') \quad (11)$$

and hence if the value of $|n_o'-n_{LC}'|$ is increased, the change rate can be raised. Practically, since the refractive index $n_B$ is about 1.3–2, the value of $|n_o'-n_{LC}'|$ is chosen so as to satisfy the following condition:

$$0.01 \leq |n_o'-n_{LC}'| \leq 10 \quad (12)$$

In this way, when ff=0.5, the focal length obtained by the liquid crystal layer 49 can be changed by at least 0.5%, and thus an effective variable focal-length lens can be realized. Also, the value of $|n_o'-n_{LC}'|$ cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance T becomes at least 70–80% and the liquid crystal can be actually used as a lens, if the liquid crystal satisfies the following condition:

$$D \cdot t \leq \lambda \cdot 15 \text{ μm} \quad (13)$$

Hence, for example, in the case of t=75 μm, if D≤λ/5, a satisfactory transmittance can be obtained.

The transmittance of the macromolecular dispersed liquid crystal layer 49 is raised as the value of the refractive index $n_p$ approaches the value of the refractive index $n_{LC}'$. On the other hand, the values of the refractive indices $n_o'$ and $n_p$ are different from each other, the transmittance of the liquid crystal layer 49 will be degraded. In FIGS. 26 and 28, the transmittance of the liquid crystal layer 49 is improved on an average when the liquid crystal layer 49 satisfies the following equation:

$$n_p = (n_o' + n_{LC}')/2 \quad (14)$$

The variable focal-length lens 44 is used as a lens, and thus in both FIGS. 26 and 28, it is desirable that the transmittances are almost the same and high. For this, although there is a limit to the substances of the macromolecules and the liquid crystal molecules 52 constituting the macromolecular cells 53, it is only necessary, in practical use, to satisfy the following condition:

$$n_o' \leq n_p \leq n_{LC}' \quad (15)$$

When Equation (14) is satisfied, Condition (13) is moderated and it is only necessary to satisfy the following condition:

$$D \cdot t \leq \lambda \cdot 60 \text{ μm} \quad (16)$$

It is for this reason that, according to the Fresnel's law of reflection, the reflectance is proportional to the square of the difference of the refractive index, and thus the reflection of light at the interfaces between the macromolecules and the liquid crystal molecules 52 constituting the macromolecular cells 53, that is, a reduction in the transmittance of the liquid crystal layer 49, is roughly proportional to the square of the difference in refractive index between the macromolecules and the liquid crystal molecules 52.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \ \mu m \cdot (1.585-1.45)^2/(n_u-n_p)^2 \quad (17)$$

where $(n_u-n_p)^2$ is a value when one of $(n_{LC}'-n_p)^2$ and $(n^{o'}-n_p)^2$ is larger than the other.

In order to largely change the focal length of the variable focal-length lens 44, it is favorable that the ratio ff is as high as possible, but in the case of ff=1, the volume of the macromolecule becomes zero and the macromolecular cells 53 cease to be formable. Thus, it is necessary to satisfy the following condition:

$$0.1 \leq ff \leq 0.999 \quad (18)$$

On the other hand, the transmittance $\tau$ improves as the ratio ff becomes low, and hence Condition (17) may be moderated, preferably, as follows:

$$4 \times 10^{-6} [\mu m]^2 \leq D \cdot t \leq \lambda \cdot 45 \ \mu m \cdot (1.585-1.45)^2/(n_u-n_p)^2 \quad (19)$$

Also, the lower limit of the thickness t, as is obvious from FIG. 26, corresponds to the diameter D, which is at least 2 nm as described above, and therefore the lower limit of D·t becomes $(2 \times 10^{-3} \ \mu m)^2$, namely $4 \times 10^{-6} \ [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 52 constituting the macromolecular cells 53 is increased in accordance with the Fresnel's formula of reflection. As such, in practical use, the diameter D must be chosen so as to satisfy the following condition:

$$7 \ nm \leq D \leq 500 \ \lambda \quad (20)$$

Figure 30:
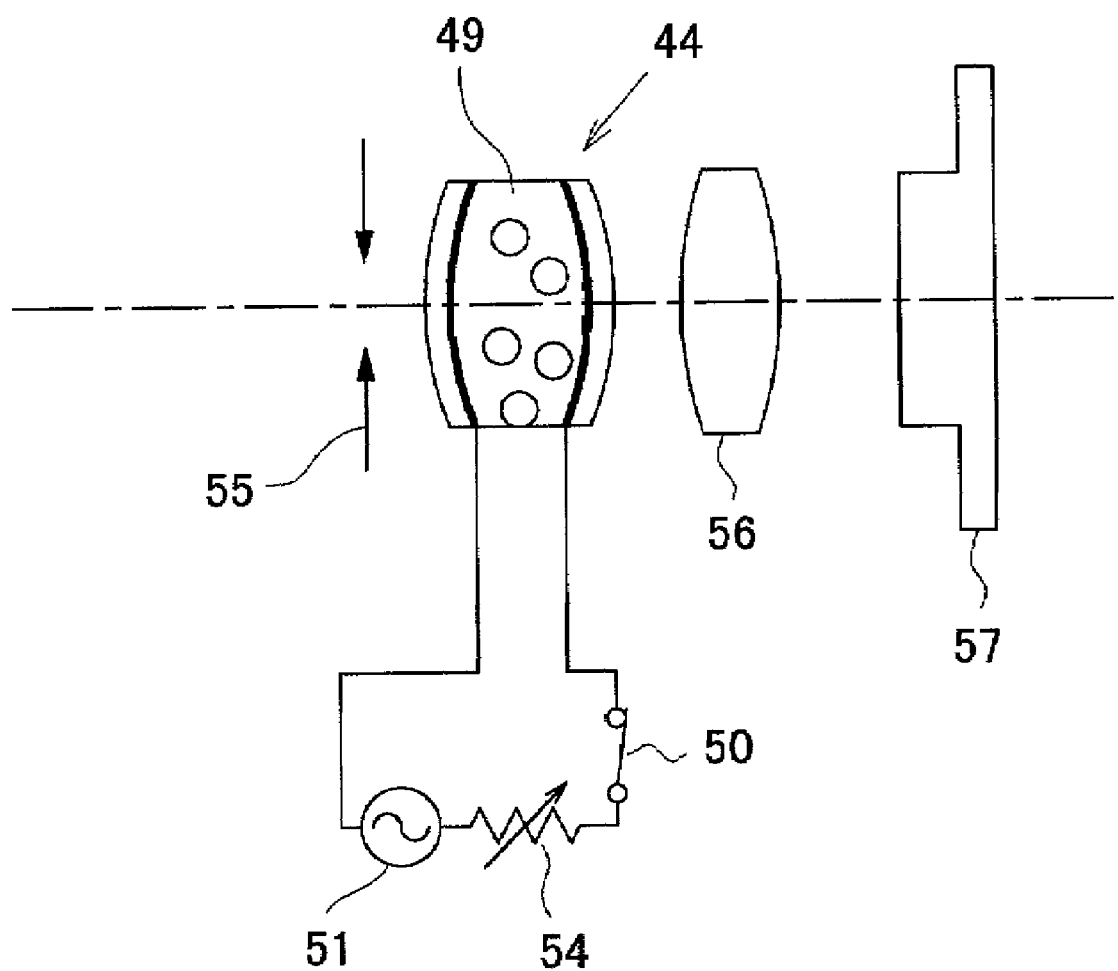
FIG. 30 is a view showing one example of an imaging optical system for digital cameras which uses the variable focal-length lens applicable to the present invention.

FIG. 30 shows an imaging optical system for digital cameras using the variable focal-length lens 44 of FIG. 29. In this imaging optical system, an image of an object (not shown) is formed on a solid-state image sensor 57, such as a CCD, through a stop 55, the variable focal-length lens 44, and a lens 56. Also, in FIG. 30, the liquid crystal molecules are not shown.

According to such an imaging optical system, the alternating voltage applied to the macromolecular dispersed liquid crystal layer 49 of the variable focal-length lens 44 is controlled by the variable resistor 54 to change the focal length of the variable focal-length lens 44. Whereby, without moving the variable focal-length lens 44 and the lens 56 along the optical axis, it becomes possible to perform continuous focusing with respect to the object distance, for example, from the infinity to 600 nm.

Figure 31:
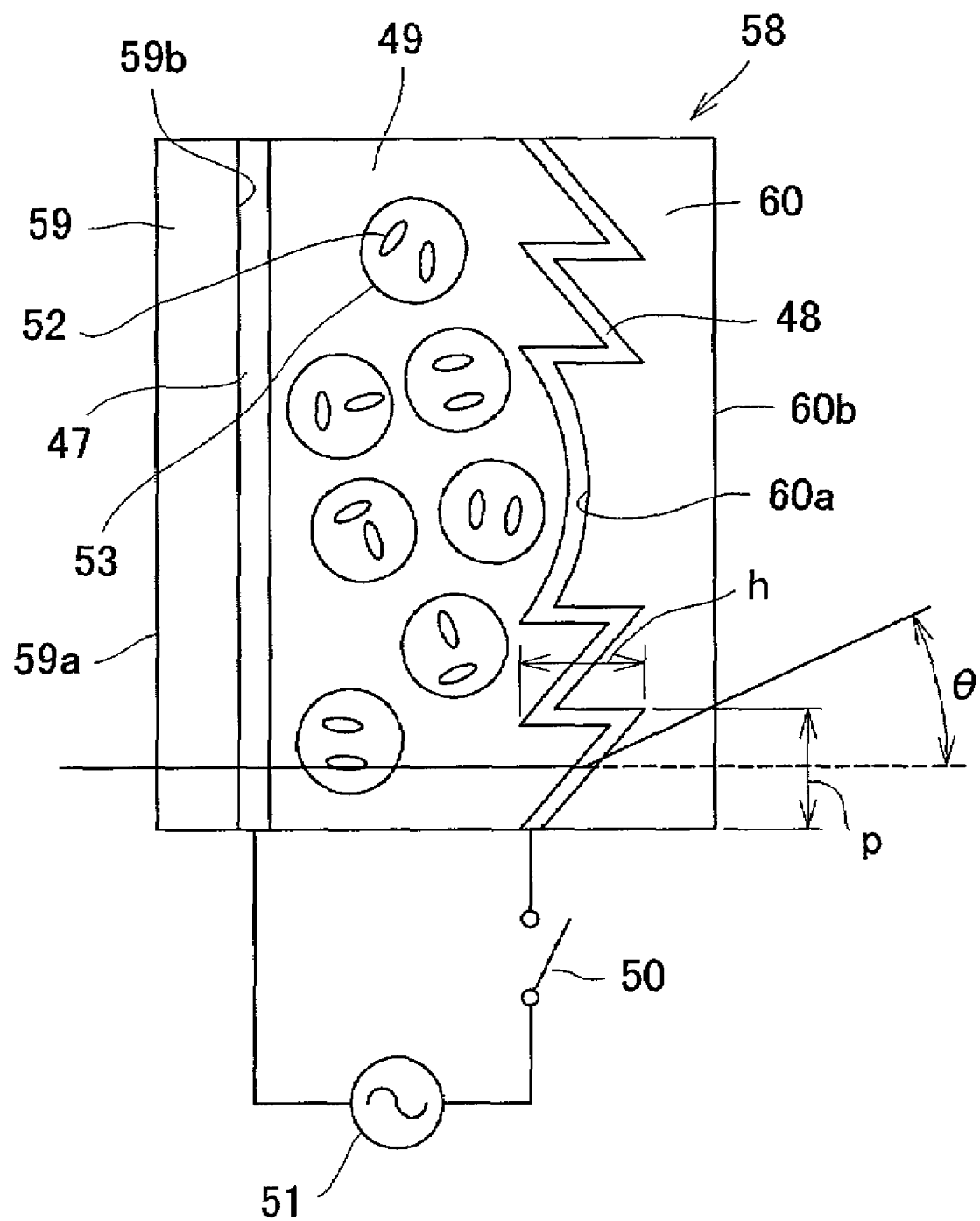
FIG. 31 is a view showing one example of a variable focal-length diffraction optical element applicable to the present invention.

FIG. 31 shows one example of a variable focal-length diffraction optical element applicable to the present invention. This variable focal-length diffraction optical element 58 includes a first transparent substrate 59 having a first surface 59a and a second surface 59b which are parallel with each other and a second transparent substrate 60 having a third surface 60a which is constructed with an annular diffraction grating of saw-like cross section having the depth of a groove corresponding to the wavelength of light and a fourth surface 60b which is flat. Incident light emerges through the first and second transparent substrates 59 and 60. Between the first and second transparent substrates 59 and 60, as in FIG. 26, the macromolecular dispersed liquid crystal layer 49 is sandwiched through the transparent electrodes 47 and 48 so that the transparent electrodes 47 and 48 are connected to the alternating-current power supply 51 through the switch 50 and the alternating-current electric field is applied to the macromolecular dispersed liquid crystal layer 49.

In such a structure, when the grating pitch of the third surface 60a is represented by p and an integer is represented by m, a ray of light incident on the variable focal-length diffraction optical element 58 is deflected by an angle θ satisfying the following equation:

$$p \sin \theta = m \lambda \quad (21)$$

and emerges therefrom. When the depth of the groove is denoted by h, the refractive index of the transparent substrate 60 is denoted by $n_{60}$, and an integer is denoted by k, a diffraction efficiency becomes 100% at a wavelength λ and the production of flare can be prevented by satisfying the following equations:

$$h(n_A-n_{60})=m\lambda \quad (22)$$

$$h(n_B-n_{60})=k\lambda \quad (23)$$

Here, the difference in both sides between Equations (22) and (23) is given by $$h(n_A-n_B)=(m-k)\lambda \quad (24)$$

Therefore, when it is assumed that λ=500 nm, $n_A$=1.55, and $n_B$=1.5, $$0.05 \ h=(m-k) \cdot 500 \ nm$$

and when m=1 and k=0, $$h=10000 \ nm=10 \ \mu m$$

In this case, the refractive index $n_{60}$ of the transparent substrate 60 is obtained as 1.5 from Equation (22). When the grating pitch p on the periphery of the variable focal-length diffraction optical element 58 is assumed to be 10 μm, θ≈2.87° and a lens with an F-number of 10 can be obtained.

The variable focal-length diffraction optical element 58, whose optical path length is changed by the on-off operation of the voltage applied to the liquid crystal layer 49, for example, can be used for focus adjustment in such a way that it is placed at a portion where the light beam of a lens system is not parallel, or can be used to change the focal length of the entire lens system.

In the embodiment, it is only necessary that Equations (22)–(24) are set in practical use to satisfy the following conditions:

$$0.7m\lambda \leq h(n_A-n_{60}) \leq 1.4m\lambda \quad (25)$$

$$0.7k\lambda \leq h(n_A-n_{60}) \leq 1.4k\lambda \quad (26)$$

$$0.7(m-k)\lambda \leq h(n_A-n_B) \leq 1.4(m-k)\lambda \quad (27)$$

Figure 32:
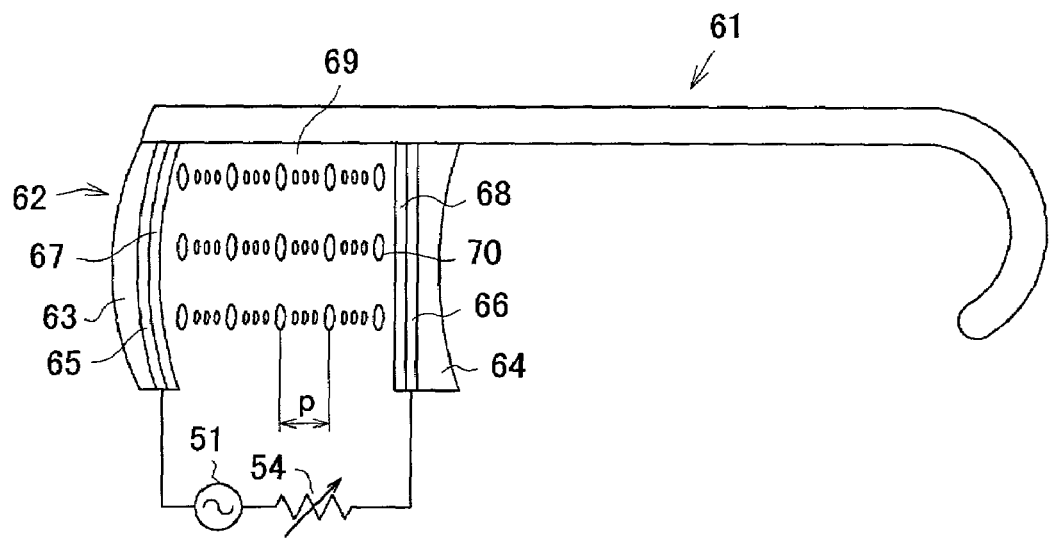
FIG. 32 is a view showing variable focal-length spectacles, each having a variable focal-length lens which uses a twisted nematic liquid crystal.
Figure 33:
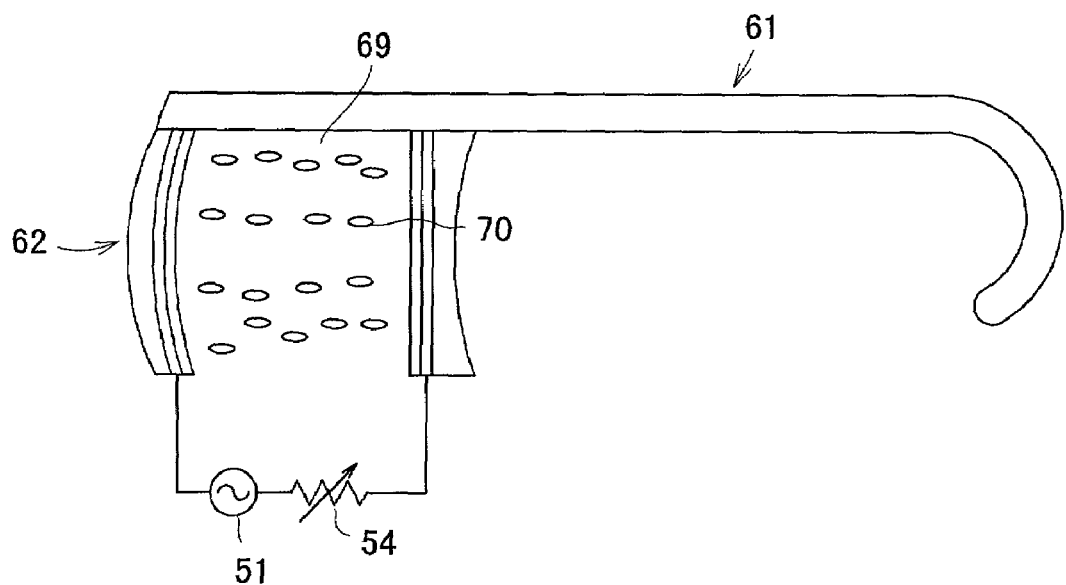
FIG. 33 is a view showing the orientation of liquid crystal molecules where a voltage applied to a twisted nematic liquid crystal layer of FIG. 32 is increased.

A variable focal-length lens using a twisted nematic liquid crystal is also available. FIGS. 32 and 33 show variable focal-length spectacles 61 in this case. A variable focal-length lens 62 has lenses 63 and 64, orientation films 67 and 68 provided through transparent electrodes 65 and 66, respectively, inside these lenses, and a twisted nematic liquid crystal layer 69 sandwiched between the orientation films. The transparent electrodes 65 and 66 are connected to the alternating-current power supply 51 through the variable resistor 54 so that an alternating-current electric field is applied to the twisted nematic liquid crystal layer 69.

In this structure, when the voltage applied to the twisted nematic liquid crystal layer 69 is increased, liquid crystal molecules 70, as illustrated in FIG. 33, exhibit a homeotropic orientation, in which the refractive index of the liquid crystal layer 69 is lower and the focal length is longer than in a twisted nematic condition of FIG. 32 in which the applied voltage is low.

A spiral pitch P of the liquid crystal molecules 70 in the twisted nematic condition of FIG. 32 must be made nearly equal to, or much smaller than, the wavelength λ of light, and thus is set to satisfy the following condition:

$$2 \text{ nm} \leq P \leq 2\lambda/3 \tag{28}$$

Also, the lower limit of this condition depends on the sizes of the liquid crystal molecules, while the upper limit is necessary for the behavior of the liquid crystal layer 69 as an isotropic medium under the condition of FIG. 32 when incident light is natural light. If the upper limit of the condition is overstepped, the variable focal-length lens 62 is changed to a lens in which the focal length varies with the direction of deflection. Hence, a double image is formed and only a blurred image is obtained.

Figure 34A:
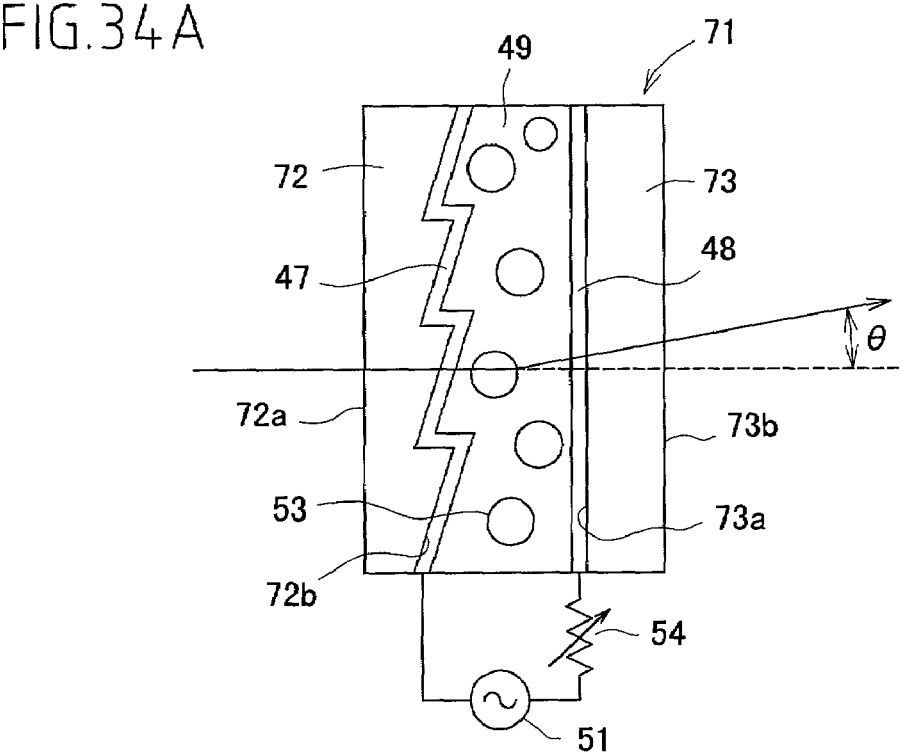
FIGS. 34A and 34B are views showing two examples of variable deflection-angle prisms, each of which is applicable to the present invention.
Figure 34B:
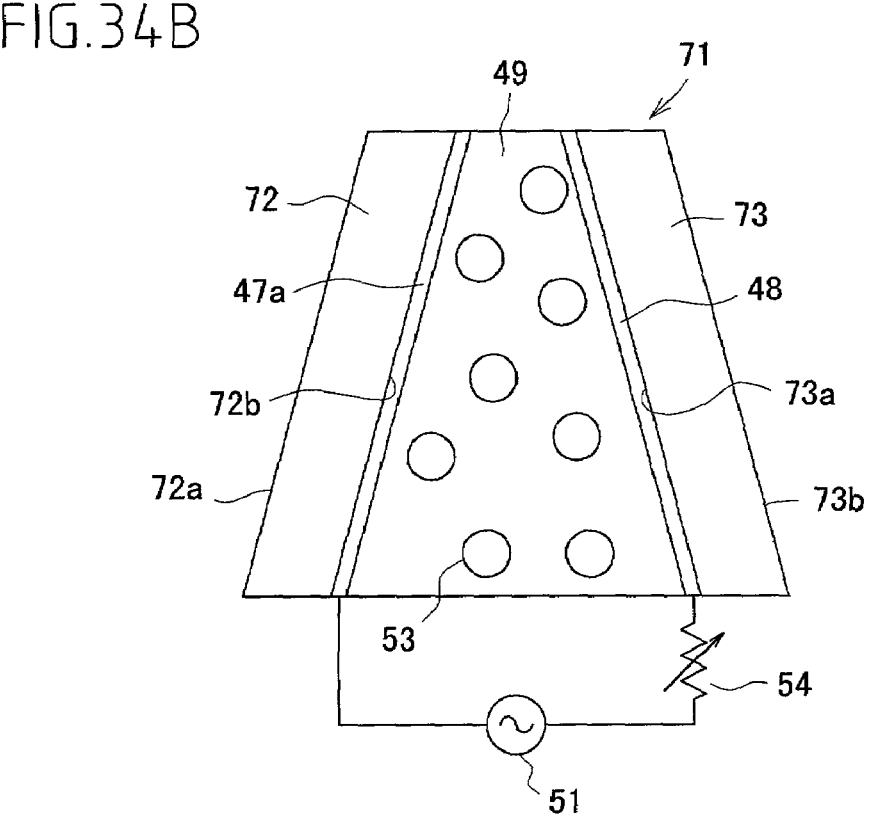

FIG. 34A shows a variable deflection-angle prism applicable to the present invention. A variable deflection-angle prism 71 includes a first transparent substrate prism 72 on the entrance side, having a first surface 72a and a second surface 72b; and a second transparent substrate 73 of a plane-parallel plate on the exit side, having a third surface 73a and a fourth surface 73b. The inner surface (the second surface) 72b of the transparent substrate 72 on the entrance side is configured into a Fresnel form, and the macromolecular dispersed liquid crystal layer 49, as in FIG. 26, is sandwiched, through the transparent electrodes 47 and 48, between the transparent substrate 72 and the transparent substrate 73 on the exit side. The transparent electrodes 47 and 48 are connected to the alternating-current power supply 51 through the variable resistor 54. Whereby, the alternating-current electric field is applied to the liquid crystal layer 49 so that the deflection angle of light transmitted through the variable deflection-angle prism 71 is controlled. Also, in FIG. 34A, the inner surface 72b of the transparent substrate 72 is configured into the Fresnel form, but as shown in FIG. 34B, the inner surfaces of the transparent substrates 72 and 73 may be configured into the shape of an ordinary prism whose surfaces are relatively inclined, or may be configured into a diffraction grating shape shown in FIG. 31. In the case of the latter, Equations (21)–(24) and Conditions (25)–(27) are also applied.

Figure 35:
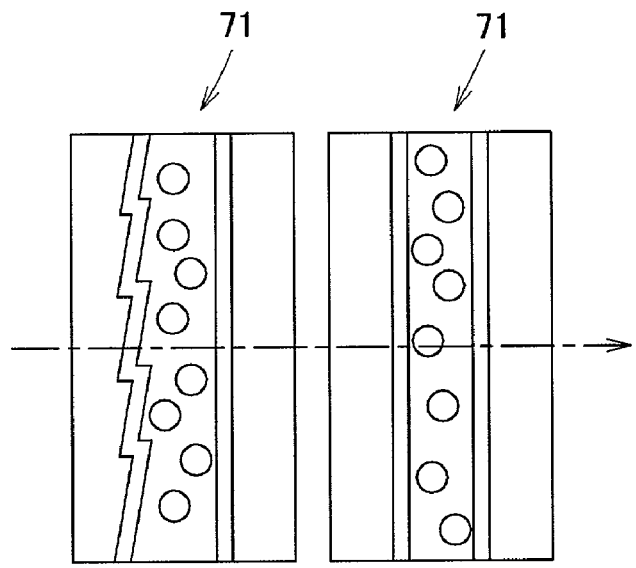
FIG. 35 is a view for explaining the applications of the variable deflection-angle prisms shown in FIGS. 34A and 34B.

The variable deflection-angle prism 71 constructed mentioned above can be effectively used for shake prevention for TV cameras, digital cameras, film cameras, binoculars, etc. In this case, it is desirable that the direction of refraction (deflection) of the variable deflection-angle prism 71 is vertical, but in order to further improve its performance, it is desirable that two variable deflection-angle prisms 71 are arranged so that the direction of deflection is varied and as shown in FIG. 35, the refraction angle is changed in vertical and lateral directions. Also, in FIGS. 34A, 34B, and 35, the liquid crystal molecules are not shown.

Figure 36:
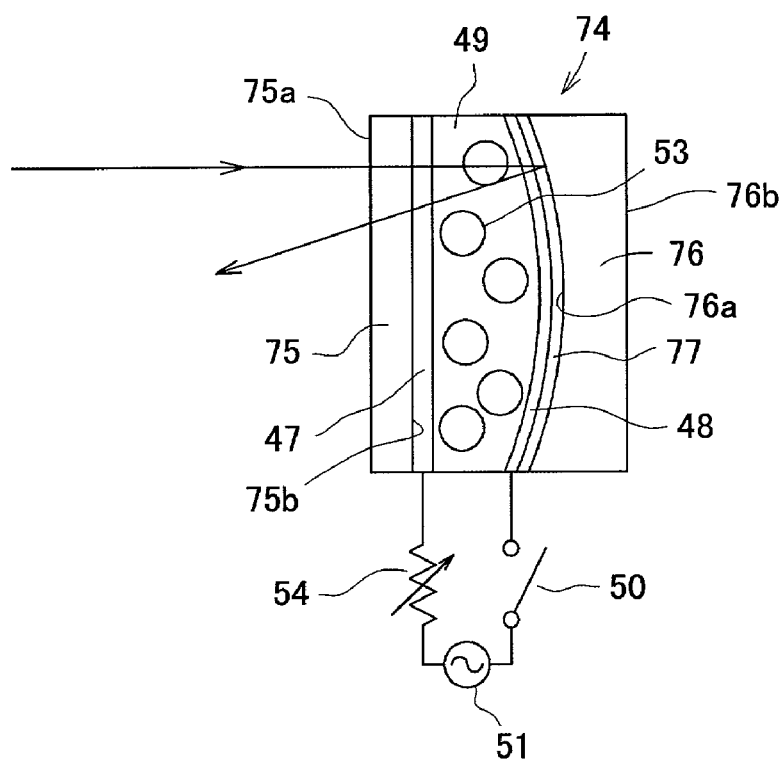
FIG. 36 is a view showing one example of a variable focal-length mirror as the variable focal-length lens applicable to the present invention.

FIG. 36 shows a variable focal-length mirror as the variable focal-length lens applicable to the present invention. A variable focal-length mirror 74 includes a first transparent substrate 75 having a first surface 75a and a second surface 75b, and a second transparent substrate 76 having a third surface 76a and a fourth surface 76b. The first transparent substrate 75 is configured into a flat plate or lens shape to provide the transparent electrode 47a on the inner surface (the second surface) 75b. The second transparent substrate 76 is such that the inner surface (the third surface) 76a is configured as a concave surface, on which a reflecting film 77 is deposited, and the transparent electrode 48 is provided on the reflecting film 77. Between the transparent electrodes 47 and 48, as in FIG. 26, the macromolecular dispersed liquid crystal layer 49 is sandwiched so that the transparent electrodes 47 and 48 are connected to the alternating-current power supply 51 through the switch 50 and the variable resistor 54, and the alternating-current electric field is applied to the macromolecular dispersed liquid crystal layer 49. Also, in FIG. 36, the liquid crystal molecules are not shown.

According to the above structure, since a ray of light incident on the transparent substrate 75 is passed again through the liquid crystal layer 49 by the reflecting film 77, the function of the liquid crystal layer 49 can be exercised twice, and the focal position of reflected light can be shifted by changing the voltage applied to the liquid crystal layer 49. In this case, the ray of light incident on the variable focal-length mirror 74 is transmitted twice through the liquid crystal layer 49, and therefore when a thickness twice that of the liquid crystal layer 49 is represented by t, Conditions mentioned above can be used. Moreover, the inner surface of the transparent substrate 75 or 76, as shown in FIG. 34A, can also be configured into the diffraction grating shape to reduce the thickness of the liquid crystal layer 49. By doing so, the amount of scattered light can be decreased.

In the above description, in order to prevent the deterioration of the liquid crystal, the alternating-current power supply 51 is used as a voltage source to apply the alternating-current electric field to the liquid crystal. However, a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 45 and 46, the transparent substrate 59, the lens 60, one of the lenses 63 and 64, the transparent substrate 73 of FIG. 34A, one of the transparent substrates 72 and 73 of FIG. 34B, or one of the transparent substrates 75 and 76 may be eliminated.

In FIG. 36 also, the static capacitance between the transparent electrodes 47 and 48 is measured, and thereby the change of the focal length of the variable focal-length mirror 74 can be found. This is because the permittivity of the liquid crystal layer 49 is altered with a change of the focal length and thus the static capacitance between the transparent electrodes 47 and 48 is also changed.

Figure 37:
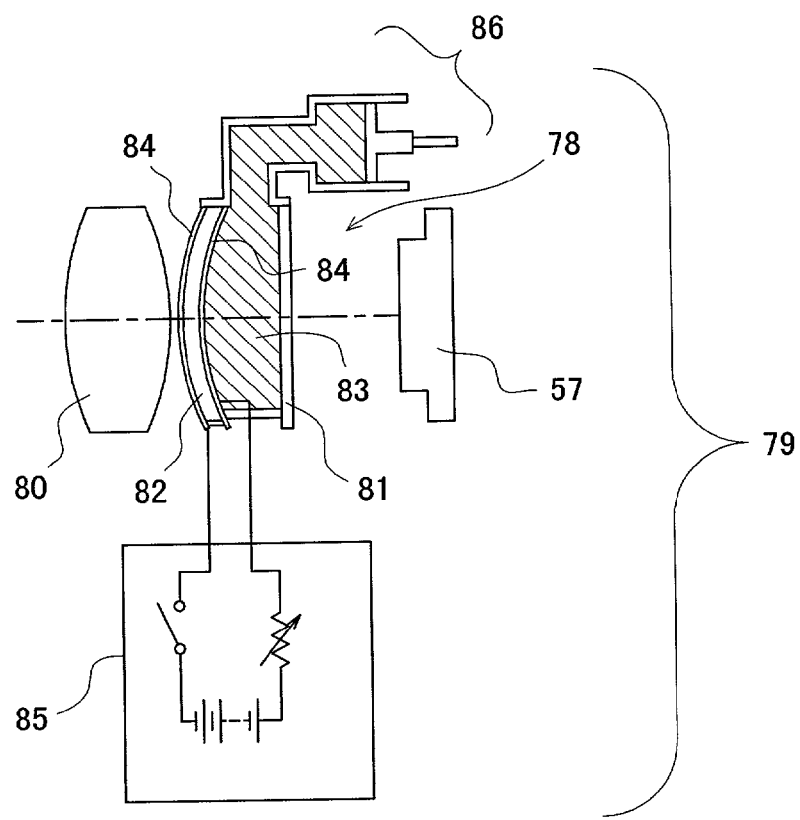
FIG. 37 is a view showing schematically an imaging unit using the variable focal-length lens, in another embodiment, applicable to the present invention.

FIG. 37 shows an imaging unit 79 using a variable focal-length lens 78, in another embodiment, applicable to the present invention. In this embodiment, a lens 80 and the variable focal-length lens 78 constitute an imaging lens, and the imaging lens and the solid-state image sensor 57 constitute the imaging unit 79. The variable focal-length lens 78 is constructed with a light-transmitting fluid or jelly-like substance 83 sandwiched between a transparent member 81 and a soft transparent substance 82 such as piezoelectric synthetic resin.

As the fluid or jelly-like substance 83, silicon oil, elastic rubber, jelly, or water can be used. Transparent electrodes 84 are provided on both surfaces of the transparent substance 82, and when the voltage is applied through a circuit 85, the transparent substance 82 is deformed by the piezoelectric effect of the transparent substance 82 so that the focal length of the variable focal-length lens 78 is changed.

Thus, according to the embodiment, even when the object distance is changed, focusing can be performed without moving the optical system with a motor, and as such the embodiment excels in compact and lightweight design and low power consumption.

In FIG. 37, reference numeral 86 denotes a cylinder for storing a fluid. For the transparent substance 82, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the deformable mirror surface, which is favorable. It is good practice to use a transparent piezoelectric substance for the variable focal-length lens.

Figure 38:
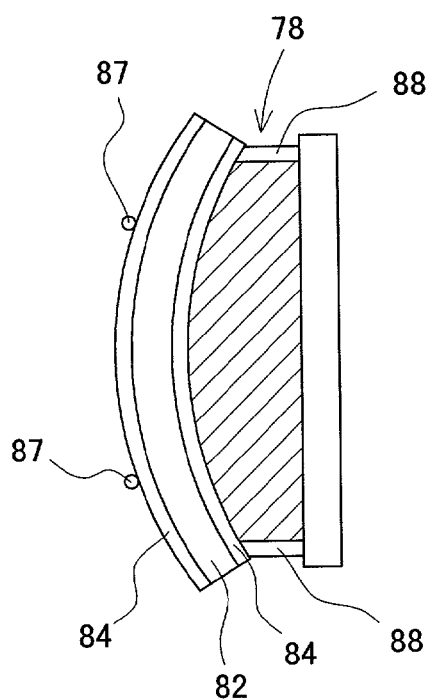
FIG. 38 is an explanatory view showing a modified example of the variable focal-length lens of FIG. 37.

In FIG. 37, instead of using the cylinder 86, the variable focal-length lens 78, as shown in FIG. 38, may be designed to use supporting members 87.

Figure 39:
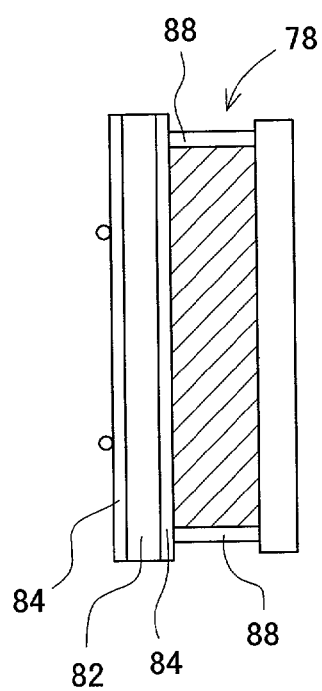
FIG. 39 is an explanatory view showing a state where the variable focal-length lens of FIG. 38 is deformed.

The supporting members 87 are designed to fix the periphery of a part of the transparent substance 82 sandwiched between the transparent electrodes 84. According to the embodiment, even when the voltage is applied to the transparent substance 82 and thereby the transparent substance 82 is deformed, as shown in FIG. 39, the volume of the entire variable focal-length lens 78 remains unchanged. As such, the cylinder 86 becomes unnecessary. Also, in FIGS. 38 and 39, reference numeral 88 designates a deformable member, which is made with an elastic body, accordion-shaped synthetic resin, or metal.

In each of the examples shown in FIGS. 37 and 38, when a reverse voltage is applied, the transparent substance 82 is deformed in a reverse direction, and thus it is also possible to construct a concave lens.

Where an electrostrictive substance, for example, acrylic elastomer or silicon rubber, is used for the transparent substance 82, it is desirable that the transparent substance 82 is constructed so that the transparent substrate and the electrostrictive substance are cemented to each other.

Figure 40:
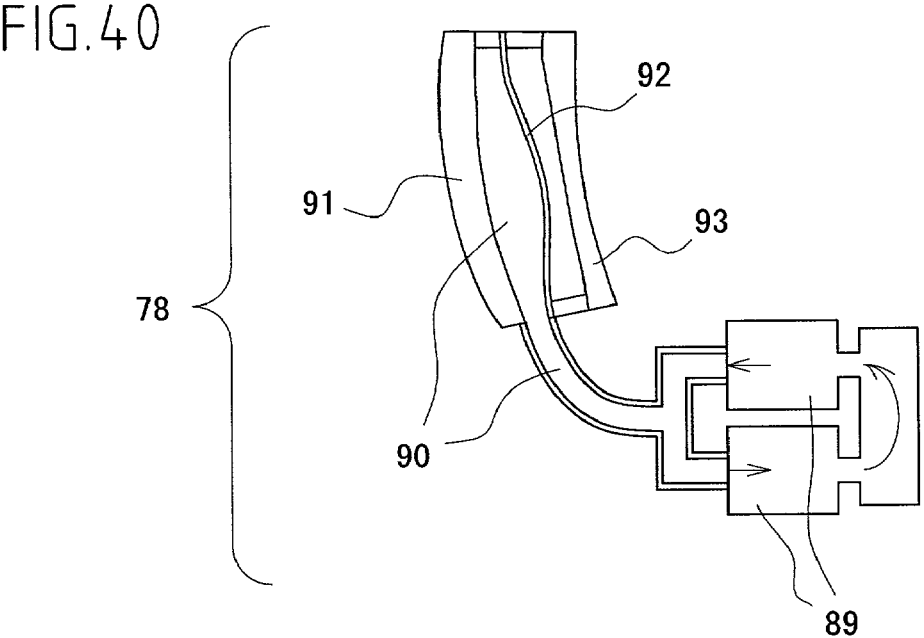
FIG. 40 is a view showing schematically another embodiment of the variable focal-length lens applicable to the present invention.

FIG. 40 shows a variable focal-length lens 78 in which a fluid 90 is taken in and out by a micropump 89 to deform the lens surface, in another embodiment of the variable focal-length lens applicable to the present invention.

The micropump 89 is a small-sized pump, for example, made by a micromachining technique and is constructed so that it is operated with an electric power. The fluid 90 is sandwiched between a transparent substrate 91 and an elastic body 92. In FIG. 40, reference numeral 93 represents a transparent substrate for protecting the elastic body 92 and this substrate is not necessarily required.

As examples of pumps made by the micromachining technique, there are those which use thermal deformations, piezoelectric substances, and electrostatic forces.

It is only necessary to use the micropump 34 shown in FIG. 30 as two micropumps, for example, as in the micropump 89 used in the variable focal-length lens 78 of FIG. 40.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 41:
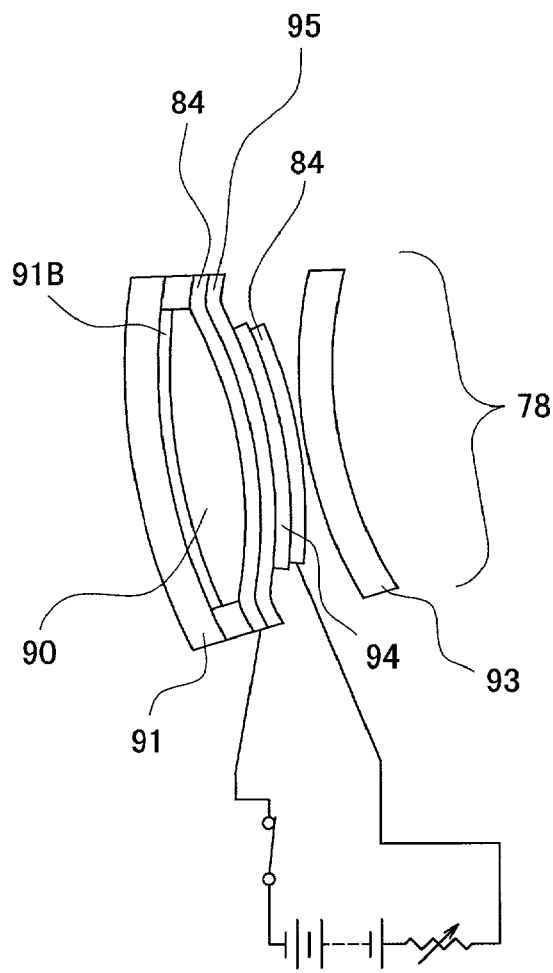
FIG. 41 is a view showing schematically a variable focal-length lens using piezoelectric substance in another embodiment of the variable optical-property element applicable to the present invention.

FIG. 41 shows a variable focal-length lens 78 using a piezoelectric substance 94 in another embodiment of a variable optical-property element applicable to the present invention.

The same substance as the transparent substance 82 is used for the piezoelectric substance 94, which is provided on a soft transparent substrate 95. It is desirable that synthetic resin or an organic substance is used for the substrate 95.

In this embodiment, the voltage is applied to the piezoelectric substance 94 through the two transparent electrodes 84, and thereby the piezoelectric substance 94 is deformed so that the function of a convex lens is exercised in FIG. 41.

Figure 42:
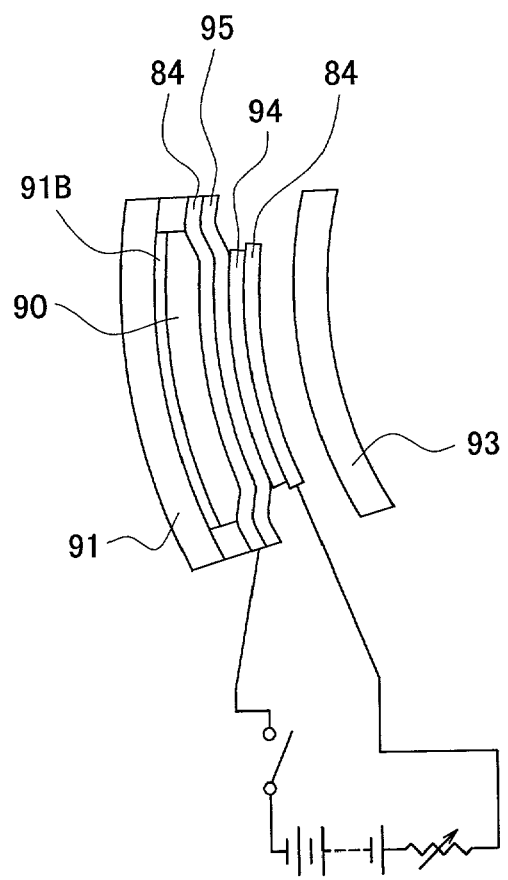
FIG. 42 is an explanatory view showing a state where the variable focal-length lens of FIG. 41 is deformed.

The substrate 95 is previously configured into a convex form, and at least one of the two transparent electrodes 84 is caused to differ in size from the substrate 95, for example, one electrode 84 is made smaller than the substrate 95. In doing so, when the applied voltage is removed, the opposite, preset portions of the two transparent electrodes 84, as shown in FIG. 42, are deformed into concave shapes so as to have the function of a concave lens, acting as the variable focal-length lens.

In this case, since the substrate 95 is deformed so that the volume of the fluid 90 is not changed, there is the merit that the liquid tank 38 becomes unnecessary.

The transparent substrates 91 and 93 may be constructed with lenses or plane surfaces, and the same may be said of the embodiment of FIG. 41.

In the variable focal-length lens of FIG. 41, by detecting the static capacitance between a transparent electrode 91B and the transparent electrode 84 on the left side or between the transparent electrode 91B and the transparent electrode 84 on the right side, the displacement of the substrate 95 can be found. That is, a change of the focal length of the variable focal-length lens. This technique is also applicable to the variable focal-length lens of each of FIGS. 43, 44, and 46. The same technique can be applied to other optical elements, for example, such as a prism whose surface profile is changed. That is, the profile of the optical surface can be found.

Figure 43:
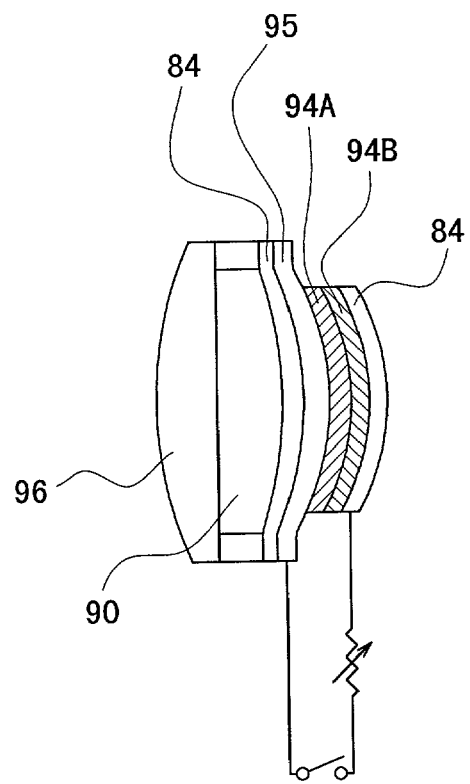
FIG. 43 is a view showing schematically a variable focal-length lens using two thin plates made with piezoelectric substances in still another embodiment of the variable optical-property element applicable to the present invention.

FIG. 43 shows a variable focal-length lens using two thin plates 94A and 94B made with piezoelectric substances in still another embodiment of the variable optical-property element applicable to the present invention.

The variable focal-length lens of this embodiment has the merit that the thin plate 94A is reversed in direction of the substance with respect to the thin plate 94B, and thereby the amount of deformation is increased so that a wide variable focal-length range can be obtained. Also, in FIG. 43, reference numeral 96 denotes a lens-shaped transparent substrate. Even in the embodiment, the transparent electrode 84 on the right side of the figure is configured to be smaller than the substrate 95.

In the embodiments of FIGS. 41–43, the thicknesses of the substrate 95, the piezoelectric substance 94, and the thin plates 94A and 94B may be rendered uneven so that a state of deformation caused by the application of the voltage is controlled. By doing so, lens aberration can be corrected, which is convenient.

Figure 44:
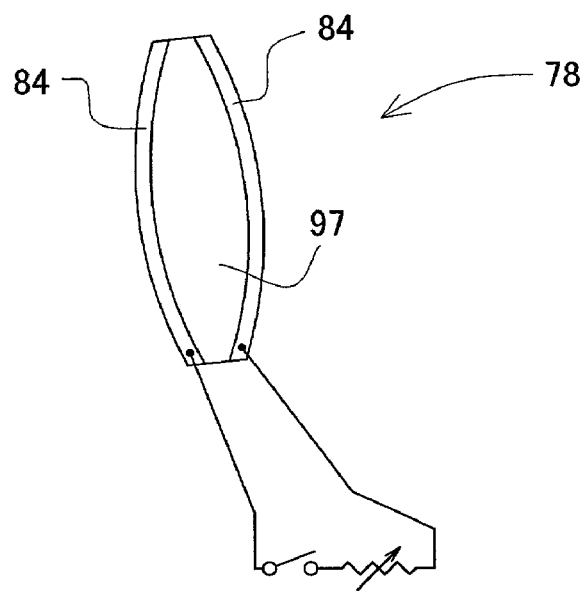
FIG. 44 is a view showing schematically another embodiment of the variable focal-length lens applicable to the present invention.

FIG. 44 shows another embodiment of the variable focal-length lens applicable to the present invention. A variable focal-length lens 78 of this embodiment uses an electrostrictive substance 97 such as silicon rubber or acrylic elastomer.

Figure 45:
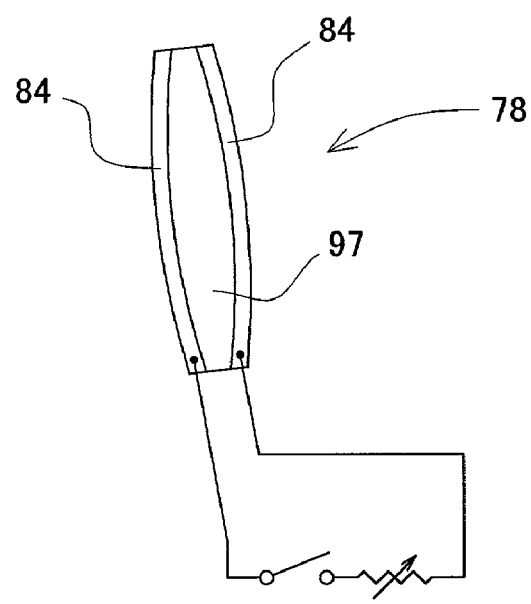
FIG. 45 is an explanatory view showing the deformation of the variable focal-length lens of FIG. 44.

According to the embodiment, when the voltage is low, the electrostrictive substance 97, as depicted in FIG. 44, acts as a convex lens, while when the voltage is increased, the electrostrictive substance 97, as depicted in FIG. 45, expands in a vertical direction and contracts in a lateral direction, and thus the focal length is increased. In this way, the electrostrictive substance 97 operates as the variable focal-length lens. According to the variable focal-length lens of the embodiment, there is the merit that since a large power supply is not required, power consumption is minimized.

Figure 46:
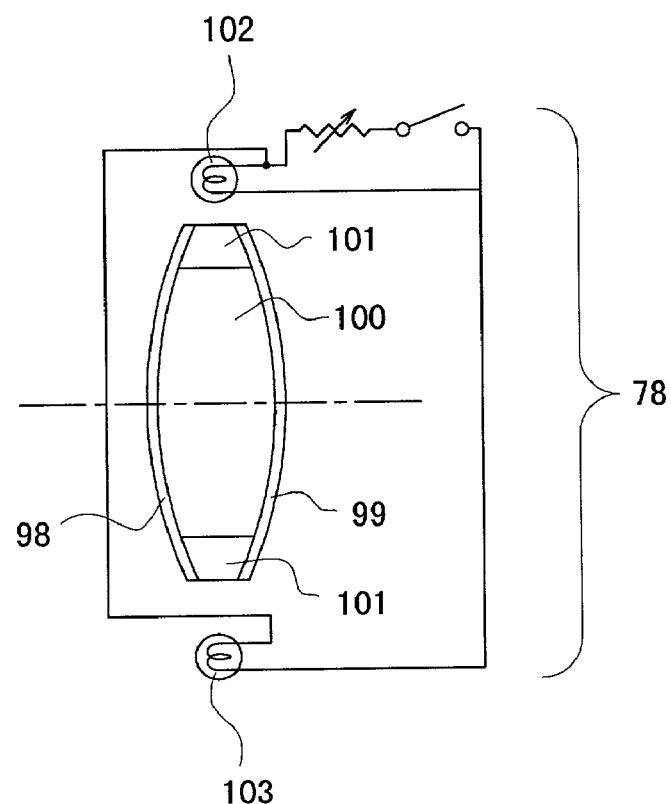
FIG. 46 is a view showing schematically a variable focal-length lens using a photonical effect in a further embodiment of the variable optical-property element applicable to the present invention.

FIG. 46 shows a variable focal-length lens using a photonical effect in a further embodiment of the variable optical-property element applicable to the present invention. A variable focal-length lens 78 of this embodiment is designed so that azobenzene 100 is sandwiched between transparent elastic bodies 98 and 99 and is irradiated with ultraviolet light through a transparent spacer 101. In FIG. 46, reference numerals 102 and 103 represent ultraviolet light sources, such as ultraviolet LEDs or ultraviolet semiconductor lasers, of central wavelengths $\lambda_1$ and $\lambda_2$, respectively.

Figure 47A:
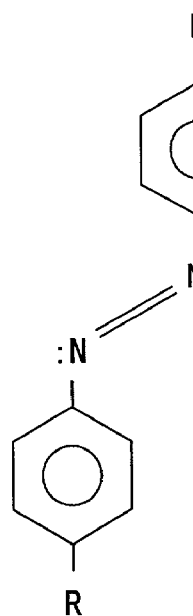
FIGS. 47A and 47B are explanatory views showing the structures of azobenzene used in the variable focal-length lens of FIG. 46.
Figure 47B:
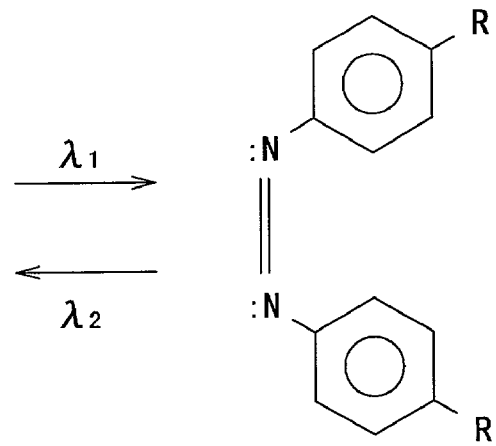

In the embodiment, trans-type azobenzene 100 shown in FIG. 47A, when irradiated with ultraviolet light of the central wavelength $\lambda_1$, changes to cis-type azobenzene shown in FIG. 47B to reduce its volume. Consequently, the thickness of the variable focal-length lens 78 is decreased, and the function of the convex lens is impaired.

On the other hand, when the cis-type azobenzene 100 is irradiated with ultraviolet light of the central wavelength $\lambda_2$, it changes to the trans-type azobenzene to increase the volume. Consequently, the thickness of the variable focal-length lens 78 is increased, and the function of the convex lens is improved.

In this way, the optical element of the embodiment acts as the variable focal-length lens. In the variable focal-length lens 78, since the ultraviolet light is totally reflected at the interface between each of the transparent elastic bodies 98 and 99 and air, the light does not leak through the exterior and high efficiency is obtained.

In the variable focal-length lens of each of the embodiments mentioned above, each of the transparent electrodes 84 and others may be divided into a plurality of electrodes. By applying different voltages to individual divided transparent electrodes, it becomes possible to carry out not only the focusing, zoom, and magnification change of the optical apparatus, but also shake compensation, compensation for degradation of optical performance by manufacturing errors, and correction for aberration.

Subsequently, a description will be given of examples of various division patterns of the transparent electrode used in the variable focal-length lens applicable to the present invention, with reference to FIGS. 48–51.

Figure 48:
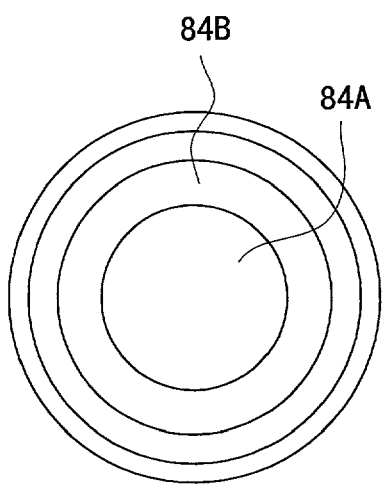
FIG. 48 is an explanatory view showing one example of division of a transparent electrode used in the variable focal-length lens applicable to the present invention.

FIG. 48 shows an example where a transparent electrode 84 is concentrically divided. A zone narrows progressively in going from the center to the periphery. It is for this reason that correction for aberration is facilitated.

Figure 49:
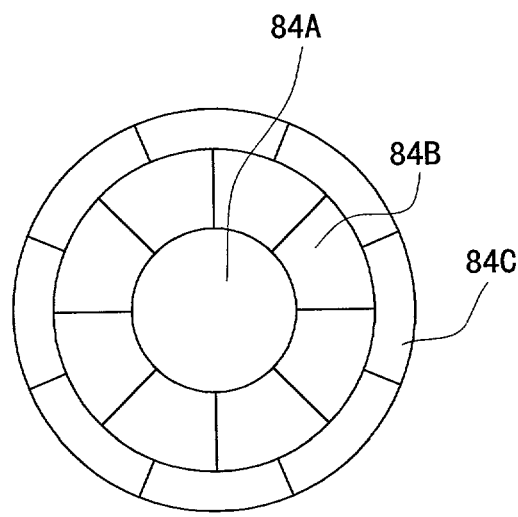
FIG. 49 is an explanatory view showing another example of division of the transparent electrode used in the variable focal-length lens applicable to the present invention.

In FIG. 49, each zone is further divided so that three boundaries of the electrodes are converged. By doing so, the shape of the piezoelectric substance 94 is smoothly changed, and hence a lens with less aberration is obtained.

Figure 50:
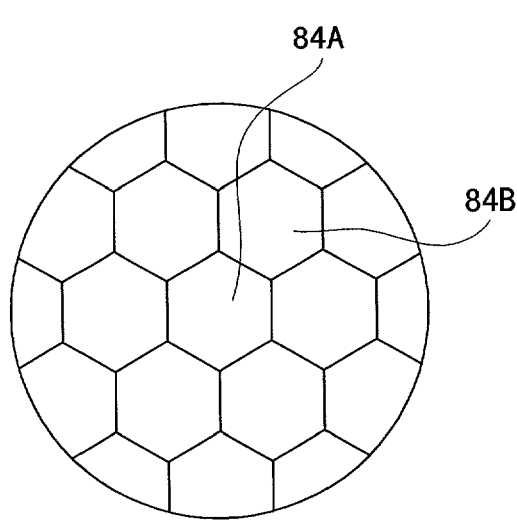
FIG. 50 is an explanatory view showing still another example of division of the transparent electrode used in the variable focal-length lens applicable to the present invention.

In FIG. 50, the transparent electrode 84 is divided into hexagons so that, for the same reason as in the above description, three boundaries of the electrodes are converged.

It is advantageous for correction for aberration that individual divided electrodes 84A, 84B, 84C, . . . in FIGS. 48 and 49 have almost the same area. Thus, it is desirable that an area ratio of an electrode with the largest area to an electrode with the smallest area, of the divided electrodes, is set within 100:1.

Figure 51:
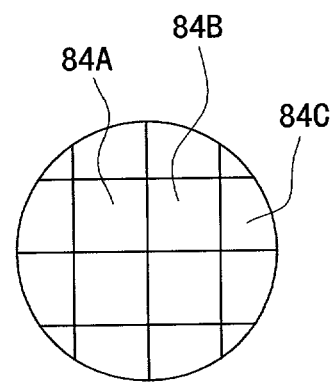
FIG. 51 is an explanatory view showing a further example of division of the transparent electrode used in the variable focal-length lens applicable to the present invention.

The divided electrodes, as in FIGS. 48–50, are arrayed so that the central electrode 600A is surrounded by others. In a circular lens, this is particularly advantageous for correction for aberration. The boundaries of the transparent electrodes which are converged may be set so that mutual angles are larger than 90°. Also, as shown in FIG. 51, the electrode may be divided into lattice-like segments. Such a division pattern has the merit that fabrication is easy.

In order to completely correct aberration or the shake of the optical system, it is desirable that the number of divided electrodes is as large as possible. At least 7 divided electrodes are required to correct second-order aberration; at least 9 divided electrodes to correct third-order aberration; at least 13 divided electrodes to correct fourth-order aberration; at least 16 divided electrodes to correct fifth-order aberration; and at least 25 divided electrodes to correct seventh-order aberration. Also, the second-order aberration refers to components in the x and y directions of tilt, astigmatism, and coma. However, if at least 3 divided electrodes are available for a low-cost product, considerable aberration or a sharp shape can be corrected.

The focal-length adjusting unit of the present invention is applicable to an electronic camera, such as a digital camera, camcorder, or TV camera, a general imaging apparatus, and a general optical apparatus. Each of the embodiments of the present invention cites the example where it is applied to the electronic camera, but, of course, is applicable to a conventional camera in which the object image is exposed on a silver halide film.

Finally, the definitions of terms employed in the present invention will be explained below.

An optical apparatus used in the present invention refers to an apparatus including an optical system or optical elements. The optical apparatus need not necessarily function by itself. That is, it may be thought of as a part of an apparatus.

The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a portable phone.

The illumination device includes, for example, a stroboscopic lamp for cameras, a headlight for cars, a light source for endoscopes, or a light source for microscopes.

The signal processing device refers to, for example, a potable phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface can be defined as follows: Any surface is satisfactory which has a shape such as aspherical, planar, or rotational symmetrical aspherical surface; a spherical, planar, or rotational symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In the present invention, such a surface is generally referred as to an extended surface.

The variable optical-property element includes a variable focal-length lens, a deformable mirror, a deflection prism in which a surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a portable phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

What is claimed is:

1. A deformable mirror having a displacement detecting function, comprising:
   a flexible thin film having a reflecting surface and an upper electrode to be deformed by electrostatic attraction; and
   a control electrode and a capacitance detecting electrode, located opposite to the flexible thin film,
   wherein a displacement of the reflecting surface can be calculated from a static capacitance between the upper electrode and the capacitance detecting electrode, and
   wherein a high-frequency voltage for detecting the static capacitance having a frequency much higher than a mechanical resonant frequency of the reflecting surface is superposed on a voltage of a constant-voltage source for deforming the reflecting surface, and a resistance is connected to a grounding side of the upper electrode to detect an amount of displacement of the reflecting surface from a phase and amplitude of an electric current flowing through the resistance.

2. A deformable mirror having a displacement detecting function according to claim 1, wherein the control electrode and the capacitance detecting electrode are configured separately in an identical layer.

3. A deformable mirror having a displacement detecting function according to claim 1, wherein the control electrode and the capacitance detecting electrode are configured separately in different layers.

4. A deformable mirror having a displacement detecting function, comprising:
   a flexible thin film having a reflecting surface and an upper electrode to be deformed by electrostatic attraction; and
   a control electrode and a capacitance detecting electrode, located opposite to the flexible thin film,
   wherein a displacement of the reflecting surface can be calculated from a static capacitance between the upper electrode and the capacitance detecting electrode, and
   wherein a high-frequency voltage of a frequency much higher than a mechanical resonant frequency of the reflecting surface is applied to the capacitance detecting electrode, and a resistance is connected to a grounding side of the upper electrode to detect an amount of displacement of the reflecting surface from a phase and amplitude of an electric current flowing through the resistance.

5. A deformable mirror having a displacement detecting function according to claim 4, wherein the control electrode and the capacitance detecting electrode are configured separately in an identical layer.

6. A deformable mirror having a displacement detecting function according to claim 4, wherein the control electrode and the capacitance detecting electrode are configured separately in different layers.

7. A deformable mirror having a displacement detecting function, comprising:
   a flexible thin film having a reflecting surface and an upper electrode to be deformed; and
   a control electrode and a capacitance detecting electrode, located opposite to the flexible thin film,
   wherein a displacement of the reflecting surface can be calculated from a static capacitance between the upper electrode and the capacitance detecting electrode, and
   wherein a high-frequency voltage for detecting the static capacitance having a frequency much higher than a mechanical resonant frequency of the reflecting surface is superposed on a voltage of a constant-voltage source for deforming the reflecting surface, and a resistance is connected to a grounding side of the upper electrode to detect an amount of displacement of the reflecting surface from a phase and amplitude of an electric current flowing through the resistance.

8. A deformable mirror having a displacement detecting function according to claim 7, wherein the control electrode and the capacitance detecting electrode are configured separately in an identical layer.

9. A deformable mirror having a displacement detecting function according to claim 7, wherein the control electrode and the capacitance detecting electrode are configured separately in different layers.

10. A deformable mirror having a displacement detecting function, comprising:
    a flexible thin film having a reflecting surface and an upper electrode to be deformed; and
    a control electrode and a capacitance detecting electrode, located opposite to the flexible thin film, wherein a displacement of the reflecting surface can be calculated from a static capacitance between the upper electrode and the capacitance detecting electrode, and wherein a high-frequency voltage of a frequency much higher than a mechanical resonant frequency of the reflecting surface is applied to the capacitance detecting electrode, and a resistance is connected to a grounding side of the upper electrode to detect an amount of displacement of the reflecting surface from a phase and amplitude of an electric current flowing through the resistance.

11. A deformable mirror having a displacement detecting function according to claim 10, wherein the control electrode and the capacitance detecting electrode are configured separately in an identical layer.

12. A deformable mirror having a displacement detecting function according to claim 10, wherein the control electrode and the capacitance detecting electrode are configured separately in different layers.

13. A deformable mirror having a displacement detecting function, comprising:

a flexible thin film having a reflecting surface and an upper electrode to be deformed by a electrostatic attraction;

a control electrode which is also used as a capacitance detecting electrode, located opposite to the flexible thin film;

a high-frequency superposing circuit provided with a voltage source and a high-frequency source to superpose a high-frequency voltage; and a capacitance detecting circuit for detecting a change of a capacitance between the control electrode and the upper electrode, wherein the upper electrode is connected to the capacitance detecting circuit, and the control electrode is connected to the high-frequency superposing circuit.

* * * * *